(12) United States Patent
Nakamura et al.

(10) Patent No.: US 10,559,860 B2
(45) Date of Patent: *Feb. 11, 2020

(54) POWER STORAGE DEVICE, POWER STORAGE CONTROL DEVICE, AND POWER STORAGE CONTROL METHOD

(71) Applicant: Murata Manufacturing Co., Ltd., Kyoto (JP)

(72) Inventors: Kazuo Nakamura, Kanagawa (JP); Atsushi Ozawa, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/022,511

(22) PCT Filed: Aug. 12, 2014

(86) PCT No.: PCT/JP2014/071266
§ 371 (c)(1),
(2) Date: Mar. 16, 2016

(87) PCT Pub. No.: WO2015/045660
PCT Pub. Date: Apr. 2, 2015

(65) Prior Publication Data
US 2016/0233556 A1    Aug. 11, 2016

(30) Foreign Application Priority Data

Sep. 26, 2013 (JP) .................................. 2013-199744

(51) Int. Cl.
*H02J 7/00* (2006.01)
*H01M 10/42* (2006.01)
(Continued)

(52) U.S. Cl.
CPC ..... *H01M 10/4257* (2013.01); *H01M 4/5825* (2013.01); *H01M 10/4264* (2013.01);
(Continued)

(58) Field of Classification Search
USPC .................................................. 320/116–123
See application file for complete search history.

(56) References Cited

U.S. PATENT DOCUMENTS

2002/0017893 A1* 2/2002 Duff, Jr. ................. H01G 9/155
320/100
2011/0140530 A1* 6/2011 Demetriades ............ H02J 3/36
307/77
(Continued)

FOREIGN PATENT DOCUMENTS

CN    103875156 A    6/2014
JP    2011-223722 A   11/2011
(Continued)

OTHER PUBLICATIONS

Office Action for CN Patent Application No. 201480051609.X, dated Jan. 30, 2018, 09 pages of Office Action and 11 pages of English Translation.
(Continued)

*Primary Examiner* — Binh C Tat
(74) *Attorney, Agent, or Firm* — Chip Law Group

(57) ABSTRACT

The present disclosure provides a power storage device, a power storage control device, and a power storage control method for suppressing a burden imposed on a cell when voltages of cells are equalized. A power storage device includes: a plurality of cells which are connected in series; a series resonance circuit configured to include a reactor and a capacitor; and a power storage control device configured to control a connection state of the cells and the series resonance circuit. The power storage control device causes
(Continued)

energy to be transferred between equal numbers of cells via the series resonance circuit.

14 Claims, 21 Drawing Sheets

(51) Int. Cl.
  *H02J 50/12* (2016.01)
  *H01M 12/06* (2006.01)
  *H01M 16/00* (2006.01)
  *H01M 4/58* (2010.01)
  *H01M 10/48* (2006.01)
  *H01M 4/02* (2006.01)

(52) U.S. Cl.
  CPC ......... *H01M 10/482* (2013.01); *H01M 12/06* (2013.01); *H01M 16/00* (2013.01); *H02J 7/0019* (2013.01); *H02J 7/0068* (2013.01); *H02J 50/12* (2016.02); *H01M 12/065* (2013.01); *H01M 2004/028* (2013.01); *H01M 2010/4271* (2013.01); *H01M 2220/20* (2013.01)

(56) References Cited

U.S. PATENT DOCUMENTS

| | | | | |
|---|---|---|---|---|
| 2012/0086283 | A1* | 4/2012 | Yamamoto | H02J 17/00 307/104 |
| 2012/0268074 | A1* | 10/2012 | Cooley | H01G 11/58 320/130 |
| 2013/0093248 | A1* | 4/2013 | Liu | H02J 7/0016 307/77 |
| 2013/0169231 | A1* | 7/2013 | Hotta | H01M 10/441 320/118 |
| 2014/0097786 | A1* | 4/2014 | Grimes | H02S 10/30 320/101 |
| 2016/0141895 | A1 | 5/2016 | Liu | |

FOREIGN PATENT DOCUMENTS

| | | | |
|---|---|---|---|
| JP | 2012-029382 | A | 2/2012 |
| JP | 2012-034446 | A | 2/2012 |
| JP | 2013-013291 | A | 1/2013 |
| JP | 2014-528692 | A | 10/2014 |
| KR | 10-2013-0091781 | A | 8/2013 |
| WO | 2009/013464 | A1 | 1/2009 |
| WO | 2013/056093 | A1 | 4/2013 |

OTHER PUBLICATIONS

Extended European Search Report of EP Patent Application No. 14847838.1, dated Mar. 28, 2017, 07 pages.

Office Action for EP Patent Application No. 14847838.1, dated Nov. 2, 2018, 04 pages of Office Action.

Office Action for CN Patent Application No. 201480051609.X, dated Nov. 5, 2018, 07 pages of Office Action and 12 pages of translation.

Office Action for EP Patent Application No. 14847838.1, dated Jul. 11, 2019, 04 pages of Office Action.

Office Action for KR Application No. 10-2016-7006643, dated Dec. 6, 2019, 6 pages of Office Action and 6 pages of English Translation.

Office Action for CN Patent Application No. 201480051609.X, dated Nov. 8, 2019, 06 pages of Office Action and 10 pages of English Translation.

* cited by examiner

POWER STORAGE DEVICE, POWER STORAGE CONTROL DEVICE, AND POWER STORAGE CONTROL METHOD

TECHNICAL FIELD

The present disclosure relates to a power storage device, a power storage control device, and a power storage control method. More specifically, the present disclosure relates to a power storage device, a power storage control device, and a power storage control method for storing electricity in a cell.

BACKGROUND ART

Technologies of equalizing voltages of a plurality of cells which are connected in series have been proposed in the related art. Patent Literature 1, for example, proposes an inter-battery voltage equalization circuit in which a terminal voltage of a capacitor is boosted by a voltage of a boosting element in which electric charges have accumulated and then the electric charges are transferred to a secondary battery.

CITATION LIST

Patent Literature

Patent Literature: JP 2013-13291A

SUMMARY OF INVENTION

Technical Problem

When a potential difference between a plurality of serially connected cells is high in a case in which voltages of the cells are to be equalized, an excessive current may flow to a cell that will receive energy and thus a burden is imposed thereon.

The present disclosure provides a power storage device, a power storage control device, and a power storage control method for suppressing a burden imposed on a cell when voltages of cells are equalized.

Solution to Problem

According to the present disclosure, a power storage device includes: a plurality of cells which are connected in series; a series resonance circuit configured to include a reactor and a capacitor; and a power storage control device configured to control a connection state of the cells and the series resonance circuit. The power storage control device causes energy to be transferred between equal numbers of cells via the series resonance circuit.

After the power storage control device connects first cells including at least one cell to the series resonance circuit, the power storage control device may connect second cells which include cells equal in number to the first cells and have a lower total voltage than the first cells to the series resonance circuit.

In this case, the power storage control device may select a plurality of consecutive cells as the first cells, and select consecutive cells equal in number to the first cells as the second cells.

On the other hand, when the first cells are connected to the series resonance circuit and then the direction of a current flowing in the series resonance circuit changes, the power storage control device may disconnect the first cells from the series resonance circuit. In this case, when the second cells are connected to the series resonance circuit and then the direction of a current flowing in the series resonance circuit changes, the power storage control device may disconnect the second cells from the series resonance circuit. In this case, the power storage control device may maintain a state in which all the cells are disconnected from the series resonance circuit during a set period after the first and/or second cells are disconnected from the series resonance circuit, and determine whether or not transfer of energy is to be finished based on a voltage of the cells during the set period.

The series resonance circuit may include a resistance, and the power storage control device may detect the direction of a current flowing in the series resonance circuit based on a potential difference of both ends of the resistance.

The power storage control device may switch connection of the series resonance circuit and the cells using a resonance frequency of the series resonance circuit.

A resonance frequency of the series resonance circuit may be a frequency when an imaginary component in a Cole-Cole plot of internal impedances of the cells measured using an AC impedance method becomes 0.

The power storage control device may cause a cell having a maximum voltage to be included in the first cells. In this case, the power storage control device may cause a cell having a minimum voltage to be included in the second cells.

The power storage device may further include: a switch configured to connect or disconnect the cells and the series resonance circuit. The power storage control device may control a connection state of the cells and the series resonance circuit by controlling an operation of the switch.

The cells may have a discharge characteristic that a change of a voltage is 0.25 V or lower in a series of sections spanning 50% or more of a section of a charge ratio of 0% to 100%.

According to the present disclosure, a power storage control device is configured to control a connection state of a plurality of cells which are connected in series and a series resonance circuit which includes a reactor and a capacitor, and to cause energy to be transferred between equal numbers of cells via the series resonance circuit.

According to the present disclosure, a power storage control method is carried out by a control device which controls a connection state of a plurality of cells which are connected in series and a series resonance circuit which includes a reactor and a capacitor to cause energy to be transferred between equal numbers of cells via the series resonance circuit.

Advantageous Effects of Invention

According to the present disclosure, a burden imposed on a cell when voltages of cells are equalized can be suppressed.

DESCRIPTION OF EMBODIMENTS

Figure 1:
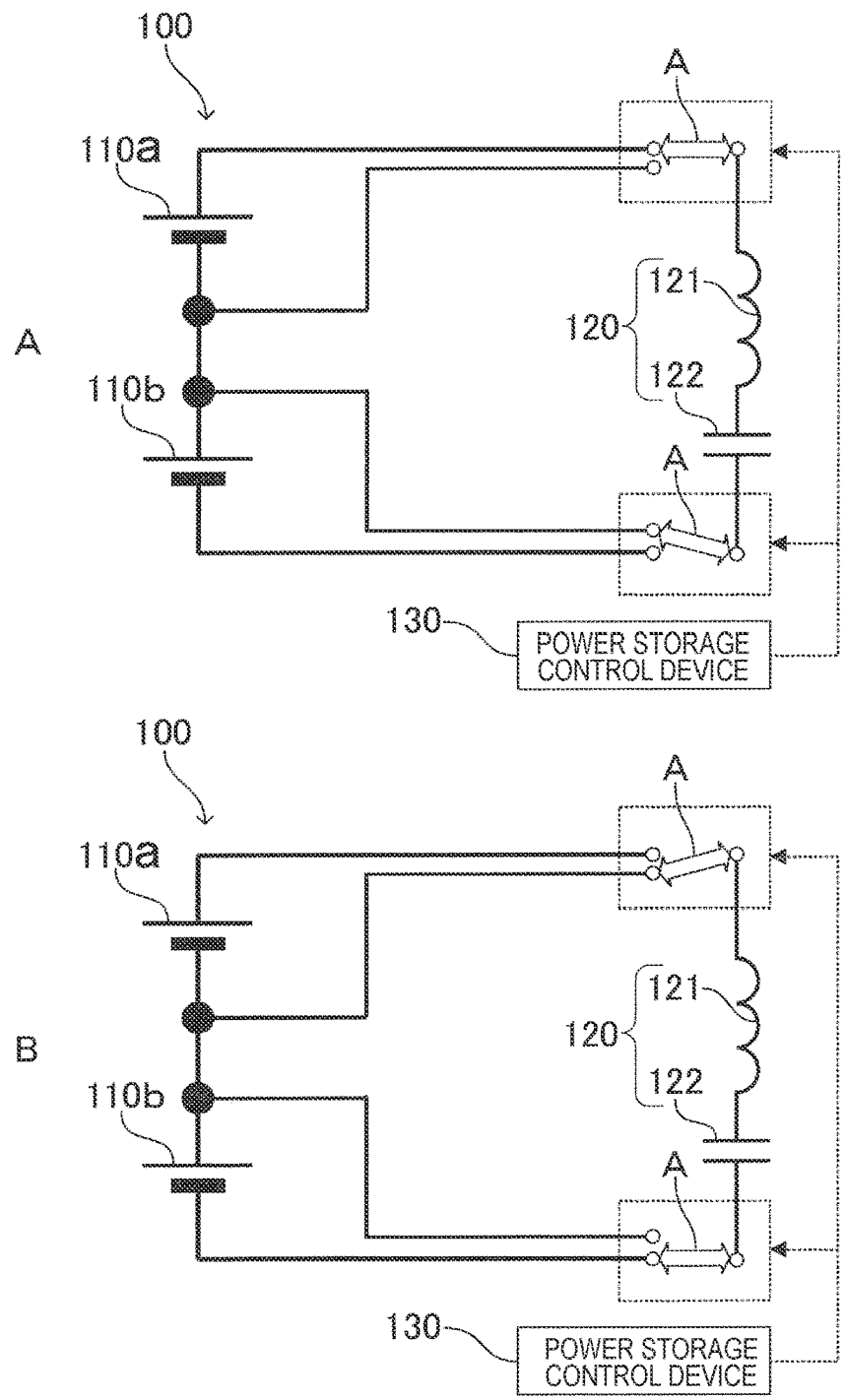
FIG. 1 is a diagram schematically showing a configuration example of a power storage device of a first embodiment of the present disclosure, in which A shows a connection state of one cell and a series resonance circuit, and B shows a connection state of another cell and the series resonance circuit.

Hereinafter, exemplary embodiments for implementing the present disclosure will be described with reference to the drawings. The plurality of embodiments described below are for showing representative examples of the embodiments of the present disclosure, and the scope of the present disclosure should not be narrowly interpreted according to them. In addition, in each of the embodiments, the same reference numerals are given to constituent elements corresponding to each other to omit overlapping description. Description will be provided in the following order.

1. First Embodiment
(Example of a power storage device in which energy is transferred between equal numbers of cells)
2. First modified example of the first embodiment
(Example of a power storage device in which energy is transferred between cell groups having equal numbers of cells)

3. Second modified example of the first embodiment
(Example of a power storage device in which energy is transferred between cell groups having equal numbers of cells among which some of the cells overlap)
4. Second Embodiment
(Example of a power storage device in which energy is transferred between a first cell having a higher voltage and a second cell having a lower voltage)
5. First modified example of the second embodiment
(Example of a power storage device in which energy is transferred between first cells including a plurality of cells and second cells including cells equal in number to the first cells)
6. Third Embodiment
(Example of a power storage device which switches connection between a cell and a series resonance circuit according to a current 0 A)
7. First modified example of the third embodiment
(Example of a power storage device which switches connection between a cell and a series resonance circuit according to a change of a direction of a current)
8. Fourth Embodiment
(Example of a power storage device which maintains a state in which all cells are disconnected from a series resonance circuit during a period set between disconnection of a second cell from the series resonance circuit and next connection of a first cell to the series resonance circuit)
9. First modified example of the fourth embodiment
(Example of a power storage device which maintains a state in which all cells are disconnected from a series resonance circuit during a period set between disconnection of a first cell from the series resonance circuit and connection of a second cell to the series resonance circuit)
10. Fifth Embodiment
(Example of a power storage device in which a series resonance circuit has a resistance)
11. First modified example of the fifth embodiment
(Example of a power storage device which detects a direction of a resonance current using a resistance)
12. Second modified example of the fifth embodiment
(Example of a power storage device in which a resistance of a series resonance circuit is a parasitic resistance)
13. Sixth Embodiment
(Example of a power storage device which switches connection between a cell and a series resonance circuit using a resonance frequency of the series resonance circuit)
14. Seventh Embodiment
(Example of a power storage device in which a series resonance circuit has a resonance frequency adaptive to a Cole-Cole plot)
15. First modified example of the seventh embodiment
(Example of a power storage device in which a resonance frequency of a series resonance circuit is set in consideration of a Cole-Cole plot of each charge ratio)
16. Eighth Embodiment
(Example of a power storage device to which a cell having a substantially flat discharge characteristic is applied)

1. First Embodiment

Device Configuration Example

FIG. 1 is an overall diagram schematically showing a configuration example of a power storage device 100 of the present embodiment. The power storage device 100 includes a plurality of cells 110a and 110b, a series resonance circuit 120, and a power storage control device 130 as shown in FIG. 1.

[Cells 110a and 110b]

The cells 110a and 110b are connected in series as shown in FIG. 1. All the cells 110a and 110b can be charged and discharged. In other words, each of the cells 110a and 110b can accumulate a charge current supplied from a charge device which is not illustrated as electric charge during charge, and can supply accumulated electric charge to a load which is not illustrated as a discharge current during discharge.

The number of cells 110a and 110b is not limited to two as shown in FIG. 1 as long as they are plural. The cells 110a and 110b may be configured according to the same standard or different standards. The cells 110a and 110b may each be single cells or battery packs. When the cells 110a and 110b are battery packs, connection inside the battery packs may be made in series, in parallel, or both. A more preferable form of the cells 110a and 110b will be described in <16. Eighth embodiment> below.

[Series Resonance Circuit 120]

As shown in FIG. 1, the series resonance circuit 120 has a reactor 121 and a capacitor 122. The reactor 121 and the capacitor 122 are connected in series.

A current flows in the series resonance circuit 120 according to inductive reactance of the reactor 121 and capacitive reactance of the capacitor 122. Self-inductance [H] of the reactor 121 and electrostatic capacitance [F] of the capacitor 122 are not limited. A more preferable mode of the series resonance circuit 120 will be described in <14. Seventh embodiment> below.

[Power Storage Control Device 130]

The power storage control device 130 controls electrical connection states of the cells 110a and 110b and the series resonance circuit 120. Here, in FIG. 1, a connection state of the cells 110a and 110b and the series resonance circuit 120 formed according to control of the power storage control device 130 is schematically indicated by bidirectional arrows A. In addition, in FIG. 1, the power storage control device 130 is configured to control the connection state, which is schematically shown by dotted lines in the drawing. Further, FIG. 1A shows a state in which the one cell 110a is connected to the series resonance circuit 120 and the other cell 110b is disconnected from the series resonance circuit 120. On the other hand, FIG. 1B shows a state in which the one cell 110a is disconnected from the series resonance circuit 120 and the other cell 110b is connected to the series resonance circuit 120.

When a potential difference between a cell on a power supply side that gives energy and a cell on a power reception side that receives the energy is significant during a voltage equalizing process, there is concern of an excessive current flowing to the cell on the power reception side which may damage the cell on the power reception side. In the present disclosure, for one purpose of suppressing a burden imposed on the cell on the power reception side caused by a potential difference between the cell on a power supply side and the cell on the power reception side, the power storage control device 130 is configured to cause energy to be transferred between equal numbers of cells. Specifically, the power storage control device 130 causes energy to be transferred between the equal numbers of cells via the series resonance circuit 120 by, for example, selectively forming the connection states shown in FIGS. 1A and 1B.

Here, transfer of energy between the equal numbers of cells in the present disclosure is performed by moving energy from n (n is an arbitrary natural number) cells on a power supply side to a series resonance circuit and moving the energy from the series resonance circuit to n cells on a power reception side. In other words, transfer of energy between the equal numbers of cells in the present disclosure is performed by selectively connecting n cells on the power supply side and n cells on the power reception side to a series resonance circuit. In addition, transfer of energy between the equal numbers of cells in the present disclosure does not entail transfer of energy between a power storage element that is included in neither the equal numbers of cells nor the series resonance circuit, such as a cell other than the equal numbers of cells, a capacitor other than the capacitor of the series resonance circuit, or the like.

The power storage control device 130 may control a connection state of the cells 110a and 110b and the series resonance circuit 120 by electrically controlling an electronic device which connects or disconnects the cells 110a and 110b and the series resonance circuit 120. In this case, the electronic device may include a switching device or the like.

The power storage control device 130 may be configured with an electronic device or the like. In this case, the electronic device may include an arithmetic processing device such as a central processing unit (CPU) or a microprocessing unit (MPU), a storage device such as a random access memory (RAM) or a read only memory (ROM). The ROM may store data and a program for realizing a function of the power storage control device 130, i.e., a program for causing a computer to function as the power storage control device 130. By executing the program stored in the ROM, the arithmetic processing device may realize the function of the power storage control device 130. The RAM may be used as a work area of the arithmetic processing device or the like. The above constituent elements, however, are not limited to the above configurations.

[Device Operation Example]

An operation example of the power storage device 100 will be described below. The operation example below includes an embodiment of the power storage control method according to the present disclosure. The power storage control method according to the present disclosure, however, may be realized with a configuration other than that of the power storage device 100.

In the present embodiment, as the power storage control device 130 controls connection states of the cells 110a and 110b and the series resonance circuit 120 as shown in FIGS. 1A and 1B, the cells 110a and 110b are selectively connected to the series resonance circuit 120. The cells 110a and 110b that are connected to the series resonance circuit 120 transfer a current to move energy with the series resonance circuit 120 interposed therebetween. Accordingly, transfer of energy is performed between the cells 110a and 110b via the series resonance circuit 120. For example, when energy retained by the one cell 110a is greater than energy retained by the other cell 110b, energy is supplied from the cell 110a to the cell 110b via the series resonance circuit 120. After the supply of energy, unevenness in energy between the cells 110a and 110b is decreased or resolved.

As described above, according to the power storage device 100 of the present embodiment, under a condition that there is a small potential difference between equal numbers of cells, i.e., between the one cell 110a and the other cell 110b, the power storage control device 130 can cause energy to be transferred between the cells using a low current. If the series resonance circuit 120 is boosted by a boosting element, it is difficult to transfer energy with a low current. In addition, since energy can be transferred via the series resonance circuit 120, a speed of a voltage equalizing process can be raised more than when only a capacitor is used, and a capability of preventing a short circuit of cells is higher than when only a reactor is used. In other words, according to the power storage device 100 of the present embodiment, a burden imposed on the cells 110 is low and an efficient and stable voltage equalizing process, i.e., an active cell balancing process, is possible.

2. First Modified Example of the First Embodiment

Figure 2:
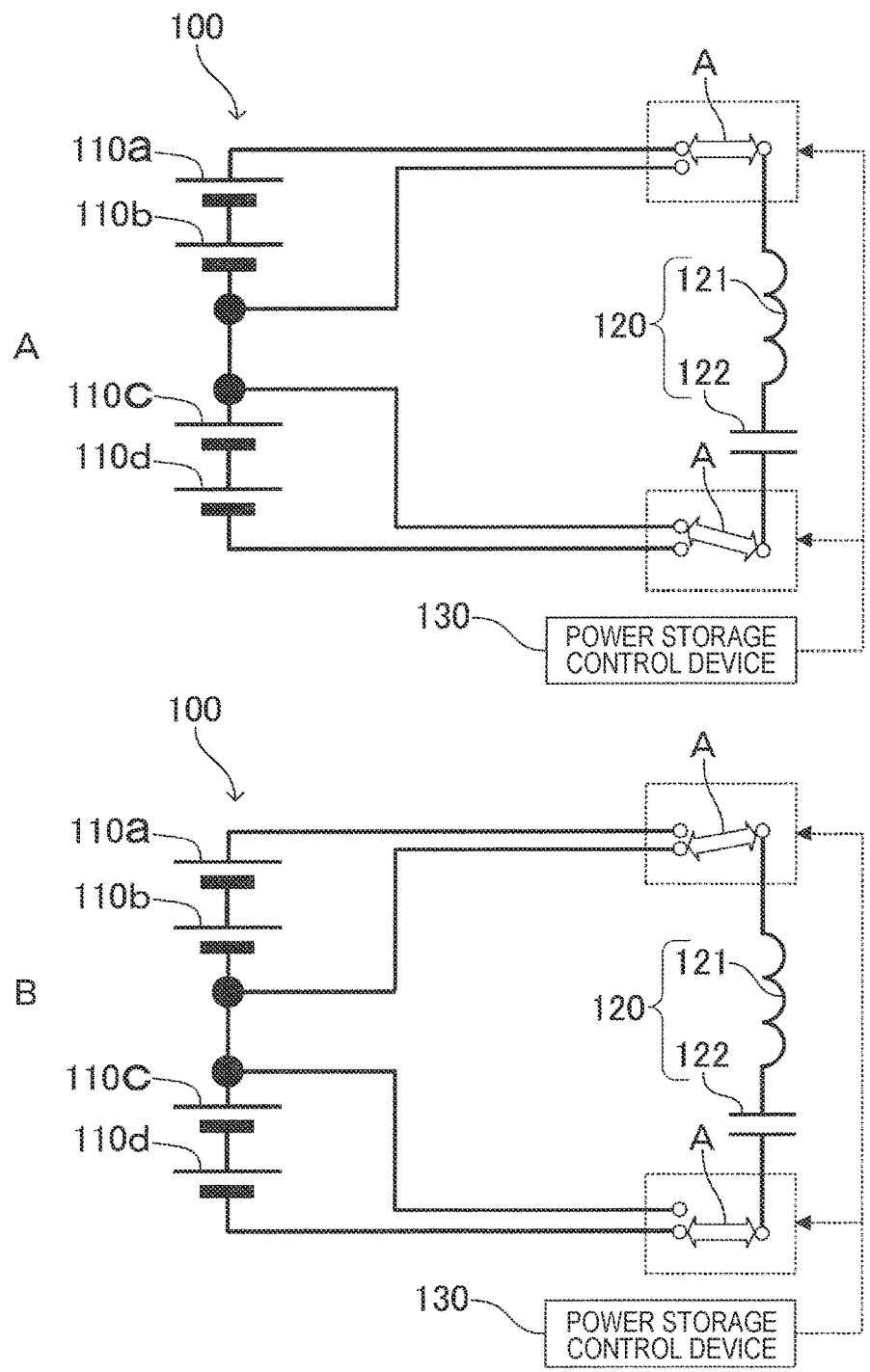
FIG. 2 is a diagram schematically showing a configuration of a power storage device of a first modified example of the first embodiment of the present disclosure, in which A shows a connection state of two cells and a series resonance circuit, and B shows a connection state of two other cells and the series resonance circuit.

FIG. 2 is an overall diagram schematically showing a configuration of a power storage device 100 of a first modified example of the present embodiment. The power storage device 100 of the present modified example has a different cell disposition form and connection state of cells and a series resonance circuit 120 formed by a power storage control device 130 from the power storage device 100 of FIG. 1. The difference will be described in detail below.

As shown in FIG. 2, the power storage device 100 of the present modified example includes four cells 110a, 110b, 110c, and 110d that are connected in series.

FIG. 2 schematically shows connection states of the cells 110a to 110d and the series resonance circuit 120 formed by control of the power storage control device 130. Specifically, FIG. 2A shows a state in which the two cells 110a and 110b are connected to the series resonance circuit 120. In addition, FIG. 2A shows a state in which the other two cells 110c and 110d are disconnected from the series resonance circuit 120. On the other hand, FIG. 2B shows a state in which the two cells 110a and 110b that are connected to the series resonance circuit 120 in FIG. 2A are disconnected from the series resonance circuit 120. In addition, FIG. 2B shows a state in which the two cells 110c and 110d that are disconnected from the series resonance circuit 120 in FIG. 2A are connected to the series resonance circuit 120.

The power storage control device 130 selectively forms connection states shown in FIGS. 2A and 2B to cause energy to be transferred between cell groups having the equal numbers of cells via the series resonance circuit 120. Other configurations and operations are basically the same as those of the power storage device 100 of FIG. 1.

According to the present modified example, the same effect as the power storage device 100 of FIG. 1 can be exhibited, and by causing energy to be transferred between cell groups, a voltage equalizing process is possible with an even lower current having a more reduced potential difference. Furthermore, a degree of freedom in the mode of the voltage equalizing process can be improved.

3. Second Modified Example of the First Embodiment

Figure 3:
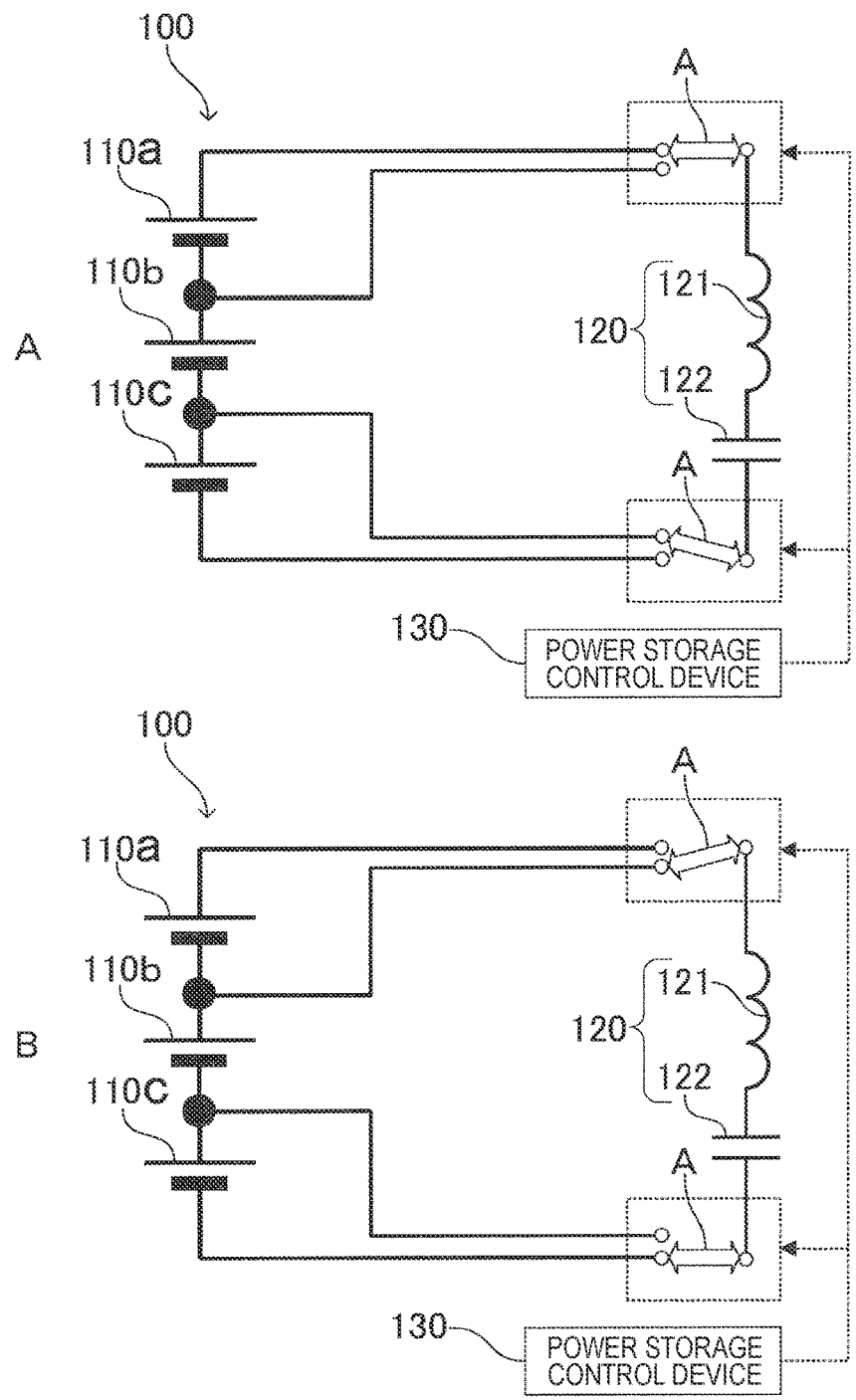
FIG. 3 is a diagram schematically showing a configuration of a power storage device of a second modified example of the first embodiment of the present disclosure, in which A shows a connection state of two cells and a series resonance circuit and B shows a state in which one of the two cells and another cell are connected to the series resonance circuit.

FIG. 3 is an overall diagram schematically showing a configuration of a power storage device 100 of a second modified example of the present embodiment. The power storage device 100 of the present modified example has a different cell disposition form and connection state of cells and a series resonance circuit 120 formed by a power storage control device 130 from the power storage devices 100 of FIGS. 1 and 2. The difference will be described in detail below.

As shown in FIG. 3, the power storage device 100 of the present modified example includes three cells 110a, 110b, and 110c that are connected in series.

FIG. 3 schematically shows connection states of the cells 110a to 110c and the series resonance circuit 120 selectively formed by the power storage control device 130. Specifically, FIG. 3A shows a state in which the two cells 110a and 110b are connected to the series resonance circuit 120 and the remaining one cell 110c is disconnected from the series resonance circuit 120. FIG. 3B shows a state in which the two cells 110b and 110c in a different combination from FIG. 3A are connected to the series resonance circuit 120 and the remaining one cell 110a is disconnected from the series resonance circuit 120. In short, in the present modified example, the one cell 110b is connected to the series resonance circuit 120 in all the connection states. This case is also included within the scope of the present disclosure because energy is transferred between the equal numbers of cells that are the two cells 110a and 110b and another combination of the two cells 110b and 110c. Other configurations and operations are basically the same as those of the power storage devices 100 of FIGS. 1 and 2.

According to the present modified example, the same effect as the power storage devices 100 of FIGS. 1 and 2 can be exhibited, and a degree of freedom in the mode of the voltage equalizing process can be improved.

4. Second Embodiment

Device Configuration Example

Figure 4:
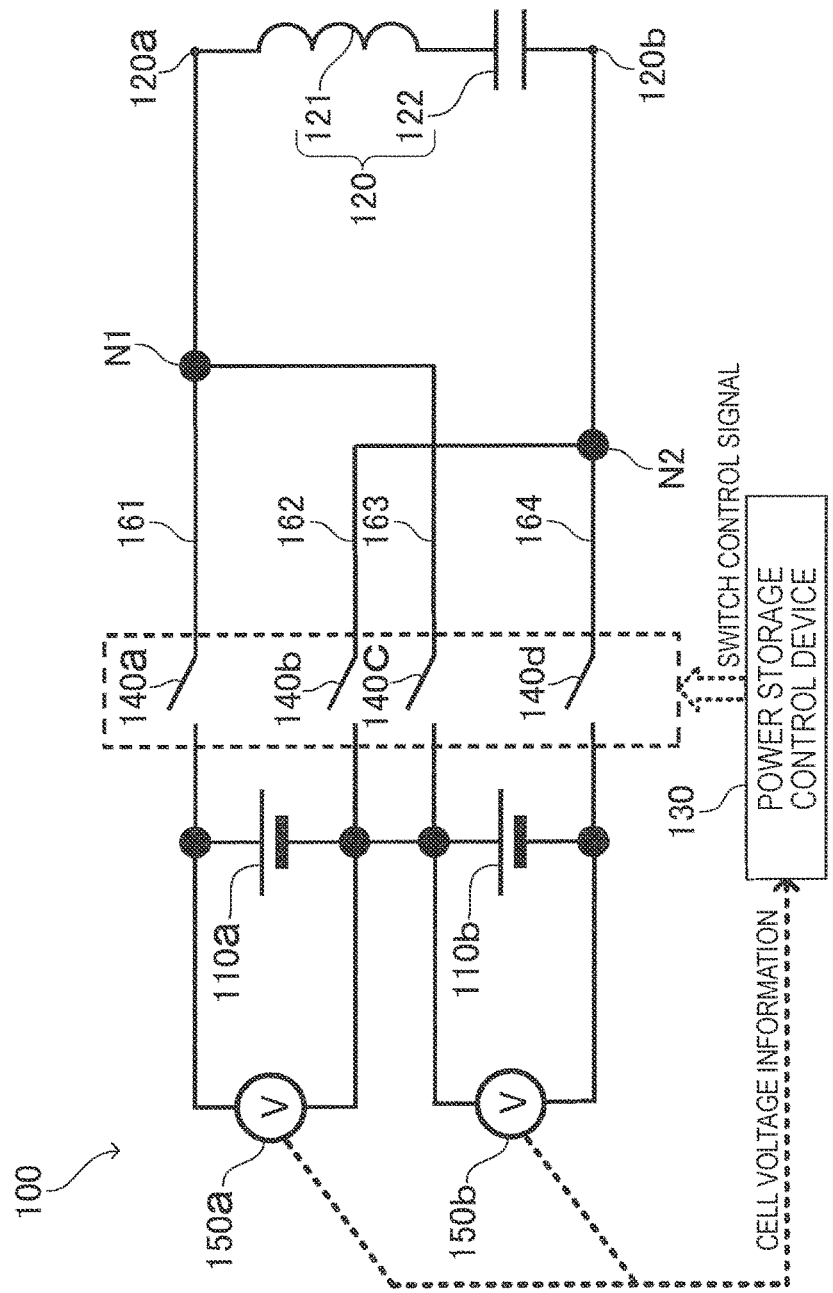
FIG. 4 is a diagram schematically showing a configuration example of a power storage device of a second embodiment of the present disclosure.

FIG. 4 is an overall diagram schematically showing a configuration example of a power storage device 100 of the present embodiment. The power storage device 100 of the present embodiment has a specified configuration of a power storage control device 130 with respect to the power storage device 100 of FIG. 1. In other words, the power storage control device 130 is configured to connect a first cell including at least one cell to a series resonance circuit 120 and then connect a second cell including the number of cells equal to that of the first cell and having a lower total voltage than the first cell to the series resonance circuit 120. When the total number of cells 110a and 110b is 2, the numbers of first cells and second cells are both 1, as shown in FIG. 4.

As an example of a specific configuration for selectively connecting the first cell and the second cell to the series resonance circuit 120 in order, the power storage device 100 includes switches 140a, 140b, 140c, and 140d, and cell voltage detection units 150a and 150b as shown in FIG. 4. The power storage control device 130 is configured to control operations of the switches 140a to 140d to control connection states of the cells 110a and 110b and the series resonance circuit 120.

[Switches 140a to 140d] The four switches 140a to 140d are each provided to correspond to the cells 110a and 110b as shown in FIG. 4. Specifically, the switches 140a to 140d are disposed such that two of them respectively correspond to the cells 110a and 110b and are configured such that every one of them is connected to the positive electrodes and negative electrodes of the cells 110a and 110b.

More specifically, the one switch 140a is connected to the positive electrode of the cell 110a. Another switch 140b is connected to the negative electrode of the cell 110a. Another switch 140c is connected to the positive electrode of the cell 110b. The remaining one switch 140d is connected to the negative electrode of the cell 110b.

In more detail, the one switch 140a is disposed on a connection line 161 which connects the positive electrode of the cell 110a and a first end 120a of the series resonance circuit 120. The switch 140a is switched on or off according to a switch control signal input from the power storage control device 130 to open or close the connection line 161.

Another switch 140b is disposed on a connection line 162 which connects the negative electrode of the cell 110a and a second end 120b of the series resonance circuit 120. The switch 140b opens or closes the connection line 162 according to a switch control signal input from the power storage control device 130.

Another switch 140c is disposed on a connection line 163 which connects the positive electrode of the cell 110b and the first end 120a of the series resonance circuit 120. The connection line 163 is connected to the other connection line 161 running to the first end 120a at a node N1. The switch 140c opens or closes the connection line 163 according to a switch control signal input from the power storage control device 130.

The remaining one switch 140d is disposed on a connection line 164 which connects the negative electrode of the cell 110b and the second end 120b of the series resonance circuit 120. The connection line 164 is connected to the other connection line 162 running to the second end 120b at a node N2. The switch 140d opens or closes the connection line 164 according to a switch control signal input from the power storage control device 130.

Among the switches 140a to 140d, a switch connected to the positive electrode of the first cell will be referred to as a switch on a first positive electrode side, and a switch connected to the negative electrode of the first cell will be referred to as a switch on a first negative electrode side hereinbelow. In addition, a switch connected to the positive electrode of the second cell will be referred to as a switch on a second positive electrode side, and a switch connected to the negative electrode of the second cell will be referred to as a switch on a second negative electrode side.

A form of the switches 140a to 140d is not limited, and the switches 140a to 140d may be configured with, for example, semiconductor elements, or the like. Such a semiconductor element may be a transistor or the like. The transistor may be a field-effect transistor or the like. The field-effect transistor may be a metal-oxide-semiconductor field-effect transistor (MOSFET) or the like. By employing the field-effect transistor, power consumption can be suppressed.

[Cell Voltage Detection Units 150a and 150b]

The cell voltage detection units 150a and 150b are provided to correspond to each of the cells 110a and 110b as shown in FIG. 4. The cell voltage detection units 150a and 150b are each connected to the corresponding cells 110a and 110b in parallel. Each of the cell voltage detection units 150a and 150b detects a voltage, i.e., a terminal voltage, of the corresponding cells 110a and 110b, and outputs the detection result to the power storage control device 130 as cell voltage information. At this time, the cell voltage information may be output in a form in which the power storage control device 130 can specify a cell that corresponds to the cell voltage information. For example, the cell voltage information may be output toward an input terminal of the power storage control device 130 with respect to each of the cells 110a and 110b, or may be associated with cell number information.

An aspect of the cell voltage detection units 150a and 150b is not limited, and any of various electronic devices that can detect voltages of the cells 110a and 110b can be employed. The electronic devices may include an integrated circuit and the like.

[Power Storage Control Device 130]

Figure 5:
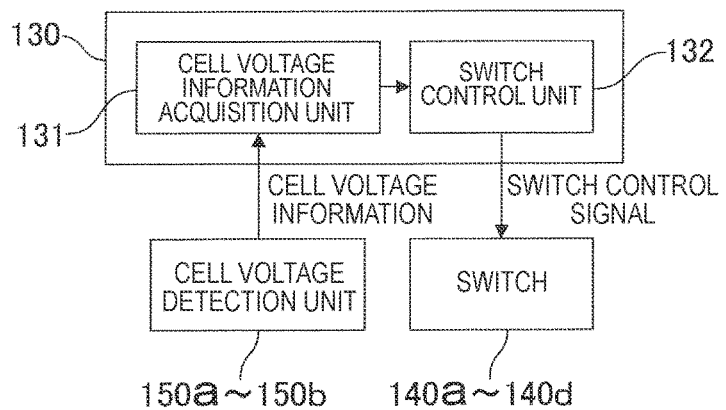
FIG. 5 is a diagram schematically showing a configuration example of a power storage control device of the power storage device of the second embodiment of the present disclosure.

FIG. 5 is a diagram schematically showing a configuration example of the power storage control device 130 of the present embodiment. As shown in FIG. 5, the power storage control device 130 has a cell voltage information acquisition unit 131 and a switch control unit 132. The cell voltage information acquisition unit 131 acquires cell voltage information output from the cell voltage detection units 150a and 150b. The switch control unit 132 outputs a switch control signal according to the cell voltage information acquired by the cell voltage information acquisition unit 131 to the switches 140a to 140d. Content of the switch control information includes causing the first cell to be connected to the series resonance circuit 120 and then causing the second cell to be connected to the series resonance circuit 120. The switch control signal may be, for example, a gate voltage applied to a field-effect transistor, or the like. The cell voltage information acquisition unit 131 and the switch control unit 132 may be embodied as hardware, software, or both.

[Device Operation Example]

Figure 6:
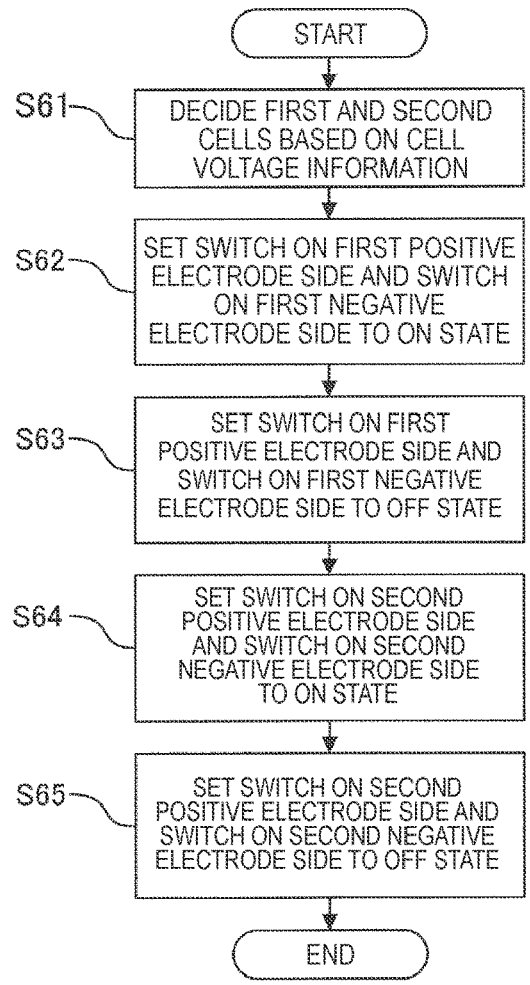
FIG. 6 is a flowchart showing an operation example of the power storage device of the second embodiment of the present disclosure.

FIG. 6 is a flowchart showing an operation example of the power storage device 100 of the present embodiment. The operation example shown in FIG. 6 includes an embodiment of the power storage control method according to the present disclosure.

For the sake of convenience of description, in an initial state of FIG. 6, all the switches 140a to 140d are assumed to be in the off state, i.e., all the cells 110a and 110b are assumed to be disconnected from the series resonance circuit 120.

Then, first from the initial state, the power storage control device 130 decides a first cell and a second cell based on cell voltage information in Step 61 (S61) of FIG. 6. For example, the power storage control device 130 decides the cell 110a as a first cell when cell voltage information from the cell voltage detection unit 150a which corresponds to the cell 110a indicates a higher voltage than cell voltage information from the cell voltage detection unit 150a which corresponds to the cell 110b. At the same time, the power storage control device 130 decides the cell 110b as a second cell.

Next, in Step 62 (S62), the power storage control device 130 switches the switch on the first positive electrode side and the switch on the first negative electrode side which correspond to the first cell decided in Step 61 (S61) to the on state. On the other hand, the power storage control device 130 maintains the switch on the second positive electrode side which corresponds to the second cell decided in Step 61 (S61) and the switch on the second negative electrode side in the off state.

Accordingly, only the first cell is connected to the series resonance circuit 120 by the connection line closed by the switch on the first positive electrode side and the connection line closed by the switch on the first negative electrode side. Thereby, a current flows from the first cell to the series resonance circuit 120 and energy moves from the first cell to the series resonance circuit 120.

Next, in Step 63 (S63), the power storage control device 130 switches the switch on the first positive electrode side and the switch on the first negative electrode side that were switched to the on state in Step 62 (S62) to the off state.

Next, in Step 64 (S64), the power storage control device 130 switches the switch on the second positive electrode side and the switch on the second negative electrode side which correspond to the second cell decided in Step 61 (S61) to the on state. At this time, the power storage control device 130 maintains the switch on the first positive electrode side and the switch on the first negative electrode side in the off state.

Accordingly, only the second cell is connected to the series resonance circuit 120 by the connection line closed by the switch on the second positive electrode side and the connection line closed by the switch on the second negative electrode side. Thereby, a current flows from the series resonance circuit 120 to the second cell and energy that moved to the series resonance circuit 120 in Step 62 (S62) is moved from the series resonance circuit 120 to the second cell.

Next, in Step 65 (S65), the power storage control device 130 switches the switch on the second positive electrode side and the switch on the second negative electrode side that were switched to the on state in Step 64 (S64) to the off state. Thereafter, the voltage equalizing process ends or the process returns to Step 62 (S62) or Step 64 (S64) if necessary.

As described above, according to the power storage device 100 of the present embodiment, after the first cell shifts energy to the series resonance circuit 120, the second cell can take the energy from the series resonance circuit 120, and thus a simple and proper voltage equalizing process becomes possible. In addition, connection states of the cells 110a and 110b and the series resonance circuit 120 can be controlled with the simple configuration including the switches 140a to 140d.

5. First Modified Example of the Second Embodiment

Device Configuration Example

Figure 7:
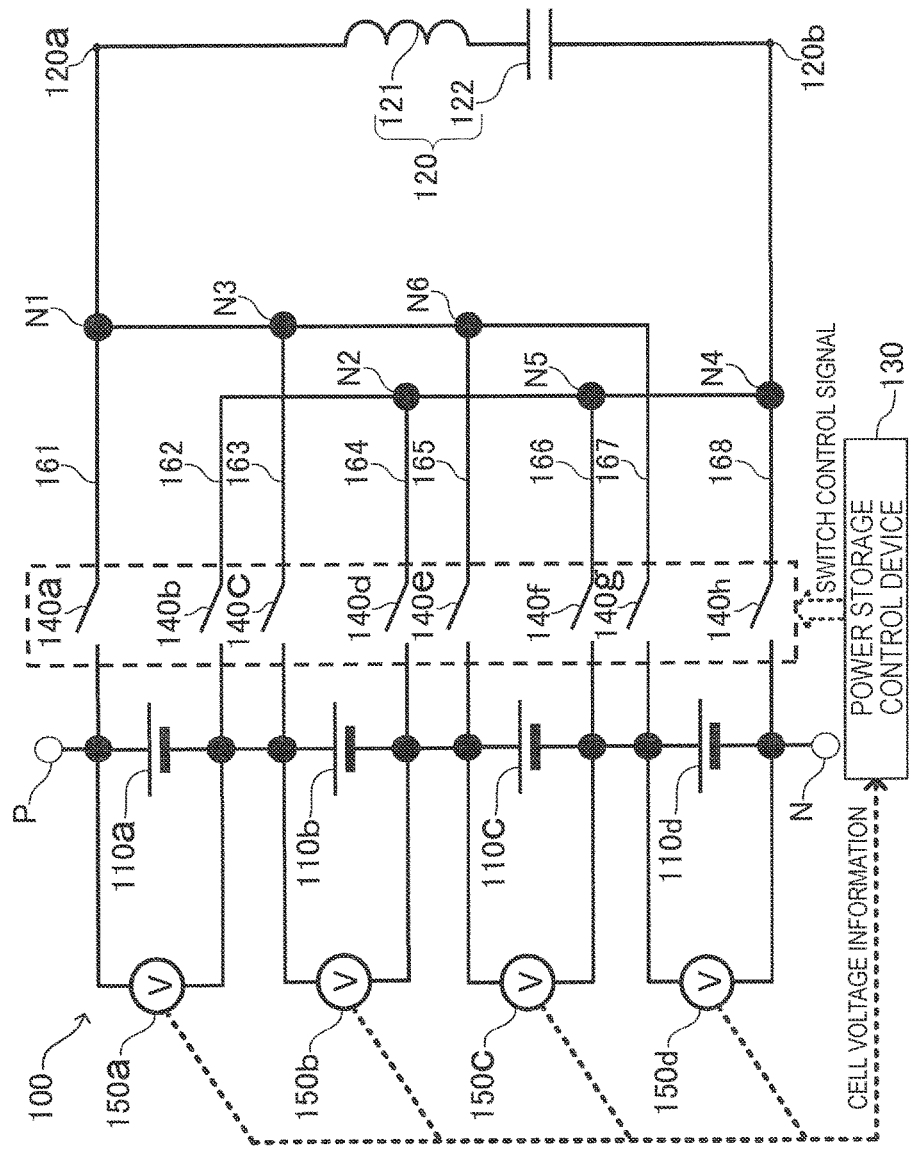
FIG. 7 is a diagram schematically showing a configuration of a power storage device of a first modified example of the second embodiment of the present disclosure.

FIG. 7 is an overall diagram schematically showing a configuration of a power storage device 100 of a first modified example of the present embodiment. The power storage device 100 of the present modified example has a different cell disposition form and connection state of cells and a series resonance circuit 120 formed by a power storage control device 130 from the power storage device 100 of FIG. 4. The differences will be described in detail below.

In the present modified example, the power storage control device 130 is configured to cause first cells including a plurality of cells to be connected to the series resonance circuit 120, and then to cause second cells including a plurality of cells equal in number to the first cells to be connected to the series resonance circuit 120. In addition, the power storage control device 130 is configured to select a plurality of consecutive cells as first cells and to select a plurality of consecutive cells equal in number to the first cells as second cells. Furthermore, the power storage control device 130 is configured to cause a cell having a maximum voltage among a plurality of serially connected cells to be included in the first cells, and a cell having a minimum voltage to be included in the second cells.

As shown in FIG. 7, the power storage device 100 of the present modified example is obtained by adding two cells 110c and 110d and two cell voltage detection units 150c and 150d, each corresponding to the cells 110c and 110d, to the configuration of FIG. 4. In addition, in the present modified example, four switches 140e, 140f, 140g, and 140h, and four connection lines 165, 166, 167, and 168 are further added. Specific disposition of the added constituent elements is as shown below.

The negative electrode of the cell 110c is connected to the positive electrode of the cell 110d. The positive electrode of the 110c is connected to the negative electrode of the cell 110b. In other words, in the present modified example, the four cells 110a to 110d are connected in series in the order of 110a, 110b, 110c, and 110d from the positive electrode terminal P to the negative electrode terminal N of all of the cells.

The cell voltage detection units 150c and 150d are connected to the corresponding cells 110c and 110d in parallel. The cell voltage detection units 150c and 150d detect voltages of the corresponding cells 110c and 110d and output detection results to the power storage control device 130 as cell voltage information.

The switch 140e is disposed on the connection line 165 which connects the positive electrode of the cell 110c that is in the third position from the positive electrode terminal P and the first end 120a of the series resonance circuit 120. The connection line 165 is connected to another connection line 163 running from the positive electrode of the second cell 110b to the first end 120a of the series resonance circuit 120 at a node N3. The switch 140e opens or closes the connection line 165 according to a switch control signal input from the power storage control device 130.

The switch 140f is disposed on the connection line 166 which connects the negative electrode of the third cell 110c and the second end 120b of the series resonance circuit 120. The connection line 166 is connected to another connection line 168 running from the negative electrode of the fourth cell 110d to the second end 120b of the series resonance circuit 120 at a node N4. In addition, the connection line 166 is connected to another connection line 164 running from the negative electrode of the second cell 110b to the second end 120b of the series resonance circuit 120 at a node N5. The switch 140f opens or closes the connection line 166 according to a switch control signal input from the power storage control device 130.

The switch 140g is disposed on the connection line 167 which connects the positive electrode of the fourth cell 110d and the first end 120a of the series resonance circuit 120. The connection line 167 is connected to another connection line 165 running from the positive electrode of the third cell to the first end 120a of the series resonance circuit 120 at a node N6. The switch 140g opens or closes the connection line 167 according to a switch control signal input from the power storage control device 130.

The switch 140h is disposed on the connection line 168 which connects the negative electrode of the fourth cell 110d and the second end 120b of the series resonance circuit 120. The switch 140h opens or closes the connection line 168 according to a switch control signal input from the power storage control device 130.

[Device Operation Example]

An operation example of the present modified example will be described with reference to FIG. 7. The operation example below includes an embodiment of the power storage control method according to the present disclosure.

For the sake of convenience of description, the power storage control device 130 is assumed to detect a voltage of the first cell 110a to be maximum and a voltage of the third cell 110c to be minimum in an initial state. In addition, all the switches 140a to 140h are assumed to be in the off state.

In addition, first from the initial state, the power storage control device 130 decides the first cell 110a and the succeeding second cell 110b as first cells. At the same time, the power storage control device 130 decides the third cell 110c and the succeeding fourth cell 110d as second cells.

Next, the power storage control device 130 switches the switch 140a which corresponds to the positive electrode of the first cell 110a, i.e., the switch on the first positive electrode side, to an on state. At the same time, the power storage control device 130 switches the switch 140d which corresponds to the negative electrode of the second cell 110b, i.e., the switch on the first negative electrode side, to an on state. Through this switching, the positive electrode of the first cell 110a is connected to the first end 120a of the series resonance circuit 120, and the negative electrode of the second cell 110b is connected to the second end 120b of the series resonance circuit 120. Accordingly, energy moves from the first cells constituted by the two consecutive, i.e., adjacent, cells 110a and 110b toward the series resonance circuit 120.

Next, the power storage control device 130 switches the switches 140a and 140d to an off state. At this time, the energy that has moved to the series resonance circuit 120 is retained in the series resonance circuit 120.

Next, the power storage control device 130 switches the switch 140e which corresponds to the positive electrode of the third cell 110c, i.e., the switch on the second positive electrode side, to an on state. At the same time, the power storage control device 130 switches the switch 140h which corresponds to the negative electrode of the fourth cell 110d, i.e., the switch on the second negative electrode side, to an on state. Through this switching, the positive electrode of the third cell 110c is connected to the first end 120a of the series resonance circuit 120, and the negative electrode of the fourth cell 110d is connected to the second end 120b of the series resonance circuit 120. Accordingly, energy moves from the series resonance circuit 120 to the second cells constituted by the two consecutive cells 110c and 110d.

In this manner, energy is transferred between cell groups having equal numbers of cells via the series resonance circuit 120. In the configuration of FIG. 7, however, transfer of energy between one cell and another cell is also included in the scope of the present disclosure.

According to the present modified example, while efficient transfer of energy is realized with the cells having a maximum voltage selected as the first cells and the cells having a minimum voltage selected as the second cells, a potential difference between the cells on the power supply side and the cells on the power reception side can be reduced more effectively by setting the first cells and second cells as cell groups. In addition, wiring in the configuration in which adjacent cells are selected as first or second cells can be simplified more than in a configuration in which cells that are not adjacent to each other are selected as first or second cells.

6. Third Embodiment

Device Configuration Example

Figure 8:
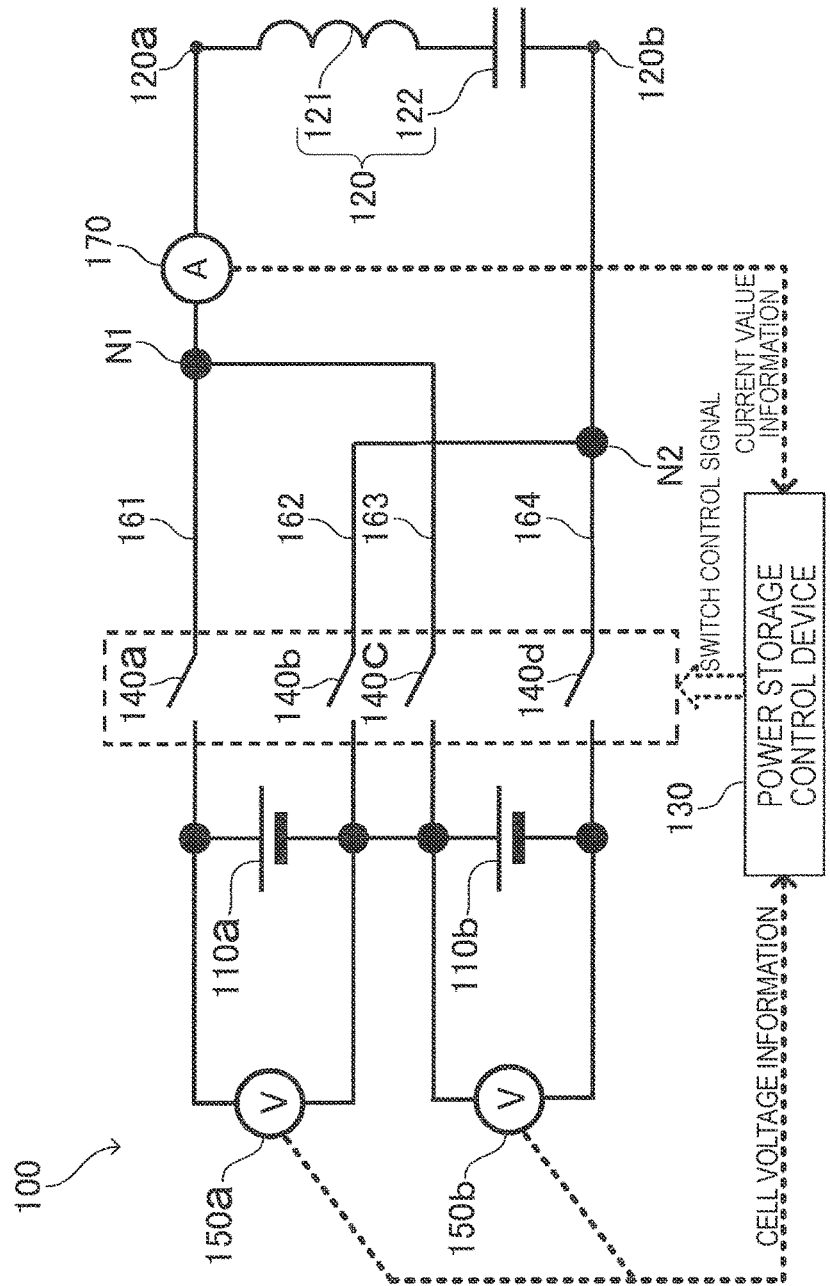
FIG. 8 is a diagram schematically showing a configuration example of a power storage device of a third embodiment of the present disclosure.

FIG. 8 is an overall diagram schematically showing a configuration example of a power storage device 100 of the present embodiment. The power storage device 100 of the present embodiment has a specified switch timing of connection of cells and a series resonance circuit 120 with respect to the power storage device 100 of FIG. 4. Details thereof will be described below.

In the present embodiment, a power storage control device 130 is configured to disconnect a first cell from the series resonance circuit 120 when a current flowing in the series resonance circuit 120 after the first cell is connected to the series resonance circuit 120 becomes 0 A. In addition, the power storage control device 130 is configured to disconnect a second cell from the series resonance circuit 120 when a current flowing in the series resonance circuit 120 after the second cell is connected to the series resonance circuit 120 becomes 0 A.

As shown in FIG. 8, the power storage device 100 has a resonance current detection unit 170 between a node N1 and the first end 120a of the series resonance circuit 120. The resonance current detection unit 170 detects a resonance current flowing to the series resonance circuit 120 and outputs a detection result to the power storage control device 130 as current value information.

[Power Storage Control Device 130]

Figure 9:
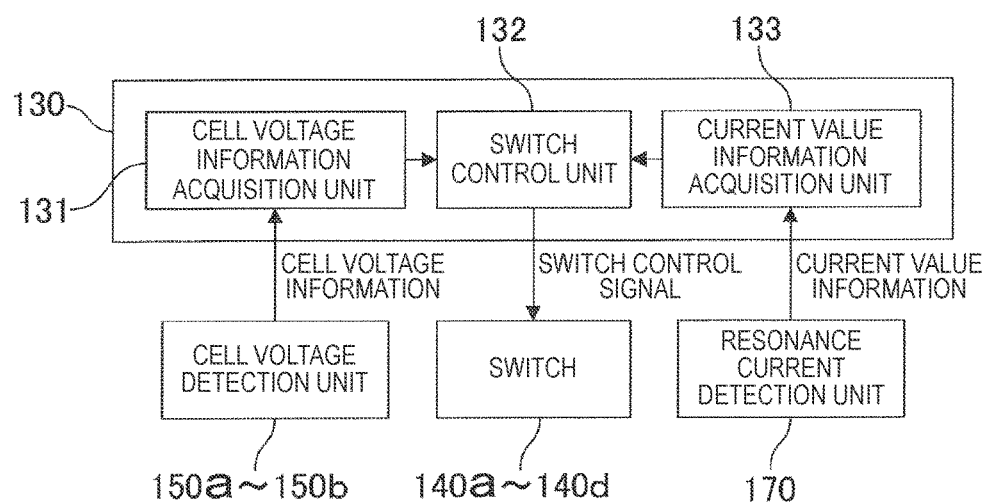
FIG. 9 is a diagram schematically showing a configuration example of a power storage control device of the power storage device of the third embodiment of the present disclosure.

The power storage control device 130 of the present embodiment is one obtained by adding a current value information acquisition unit 133 to the power storage control device 130 of FIG. 5 as shown in FIG. 9. The current value information acquisition unit 133 acquires current value information output from the resonance current detection unit 170. The switch control unit 132 outputs cell voltage information acquired by the cell voltage information acquisition unit 131 and a switch control signal according to the current value information acquired by the current value information acquisition unit 133 to the switches 140a to 140d. Content of the switch control signal includes disconnecting a cell that was connected to the series resonance circuit 120 at the time at which the value of a current flowing in the series resonance circuit 120 was 0 A from the series resonance circuit 120. The current value information acquisition unit 133 may be embodied as hardware, software, or both.

[Device Operation Example]

Figure 10:
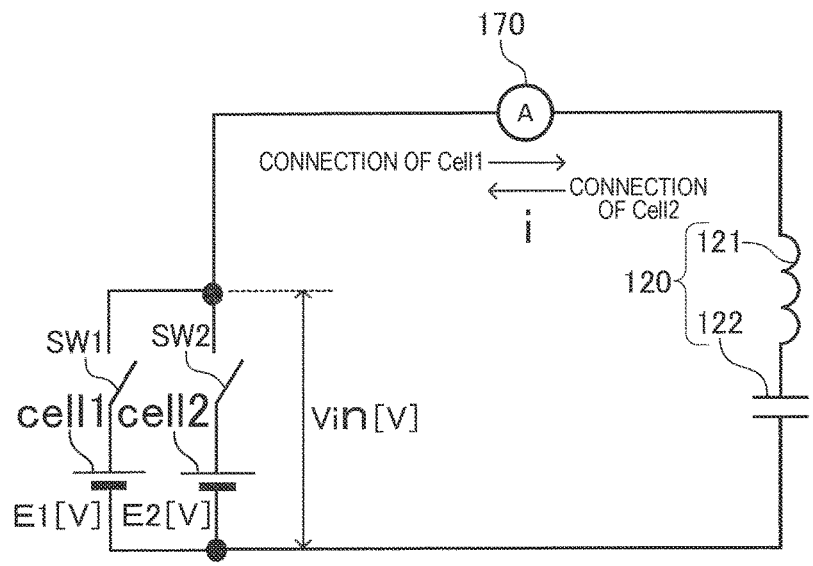
FIG. 10 is a diagram showing the power storage device of the third embodiment of the present disclosure as an equivalent circuit.

An operation of the power storage device 100 of the present embodiment can be described as an operation of an equivalent circuit of the power storage device 100 shown in FIG. 10. In FIG. 10, a switch on a first positive electrode side and a switch on a first negative electrode side which correspond to a first cell (Cell1) are expressed as one switch SW1. In addition, a switch on a second positive electrode side and a switch on a second negative electrode side which correspond to a second cell (Cell2) are expressed as one switch SW2 in FIG. 10. The resonance current detection unit 170 detects a resonance current i running from the first cell to the series resonance circuit 120 in a state in which the first cell is connected to the series resonance circuit 120, i.e., an on state of the switch SW1. In addition, the resonance current detection unit 170 detects the resonance current i running from the series resonance circuit 120 to a second cell in a state in which the second cell is connected to the series resonance circuit 120, i.e., an on state of the switch SW2.

[Time Charts]

Figure 11:
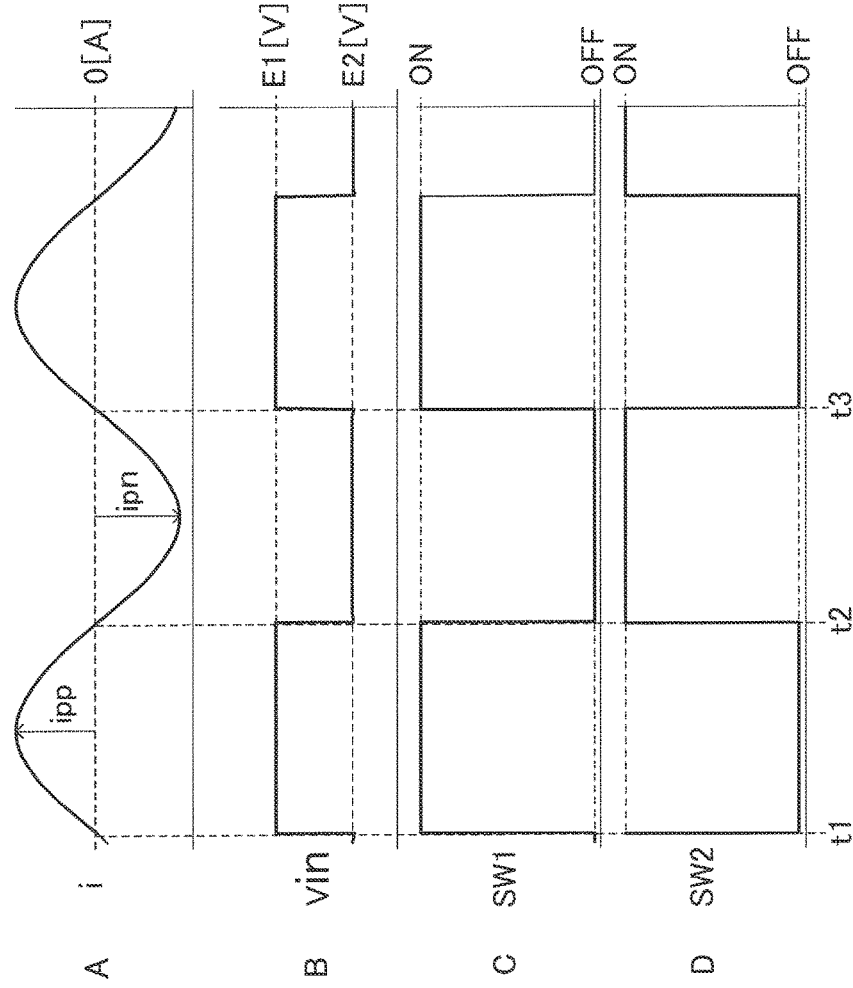
FIG. 11 includes time charts showing an operation example of the power storage device of the third embodiment of the present disclosure, among which A is a time chart showing a current flowing in a series resonance circuit, B is a time chart showing a voltage of a cell, C is a time chart showing open and closed states of a first switch, and D is a time chart showing open and closed states of a second switch.

FIG. 11 shows time charts of the equivalent circuit of FIG. 10.

In the time charts of FIG. 11, an operation from a time t1 at which the resonance current i (see FIG. 11A) is 0 A is shown. The time t1 may be an operation start time. At the time t1, the resonance current detection unit 170 detects 0 A, and the power storage control device 130 switches the switch SW1 to an on state as shown in FIG. 11C based on the detection result of the resonance current detection unit 170. When the time t1 is an operation start time, switching of the switch SW1 may be performed at the time t1 triggered by decision of a first cell and a second cell.

By switching the switch SW1 to the on state, a terminal voltage Vin [V] of FIG. 10 becomes a voltage E1 [V] of the first cell, and the resonance current i flows in a forward direction from the first cell to the series resonance circuit 120. Accordingly, discharge is performed from the first cell to the series resonance circuit 120. When an amplitude of the resonance current i in the forward direction changes sinusoidally according to time and reaches a positive peak value ipp (see FIG. 11A), the current becomes 0 A at a time t2. When the resonance current detection unit 170 detects 0 A at that time, the power storage control device 130 switches the switch SW1 to an off state and switches the switch SW2 to an on state.

When the switch SW2 is switched to the on state, the terminal voltage Vin [V] becomes a voltage E2 [V] of the second cell and the resonance current i whose direction has reversed flows into the second cell from the series resonance circuit 120. Accordingly, charge is performed from the series resonance circuit 120 to the second cell. When an amplitude of the resonance current i in the reverse direction changes sinusoidally according to time and reaches a negative peak value ipn (see FIG. 11A), the current becomes 0 A at a time t3. When the resonance current detection unit 170 detects 0 A again at that time, the power storage control device 130 switches the switch SW2 to an off state and switches the switch SW1 to an on state if necessary.

By repeating the operation of one cycle described above according to necessity, energy is transferred between the first cell and the second cell via the series resonance circuit 120, and thereby voltages of the cells are equalized.

According to the present embodiment, since loss of electricity caused by opening and closing of the switches can be suppressed, energy can be efficiently transferred between the equal numbers of cells.

7. First Modified Example of the Third Embodiment

Device Configuration Example

A power storage device 100 of the present modified example has a different configuration for switching connection of a cell and a series resonance circuit 120 from the power storage device 100 of FIG. 8. Details thereof will be described below.

A power storage control device 130 of the present modified example is configured to disconnect a first cell from the series resonance circuit 120 when a direction of a current flowing in the series resonance circuit 120 is changed after the first cell is connected to the series resonance circuit 120. In addition, the power storage control device 130 is configured to disconnect a second cell from the series resonance circuit 120 when a direction of a current flowing in the series resonance circuit 120 is changed after the second cell is connected to the series resonance circuit 120.

Figure 12:
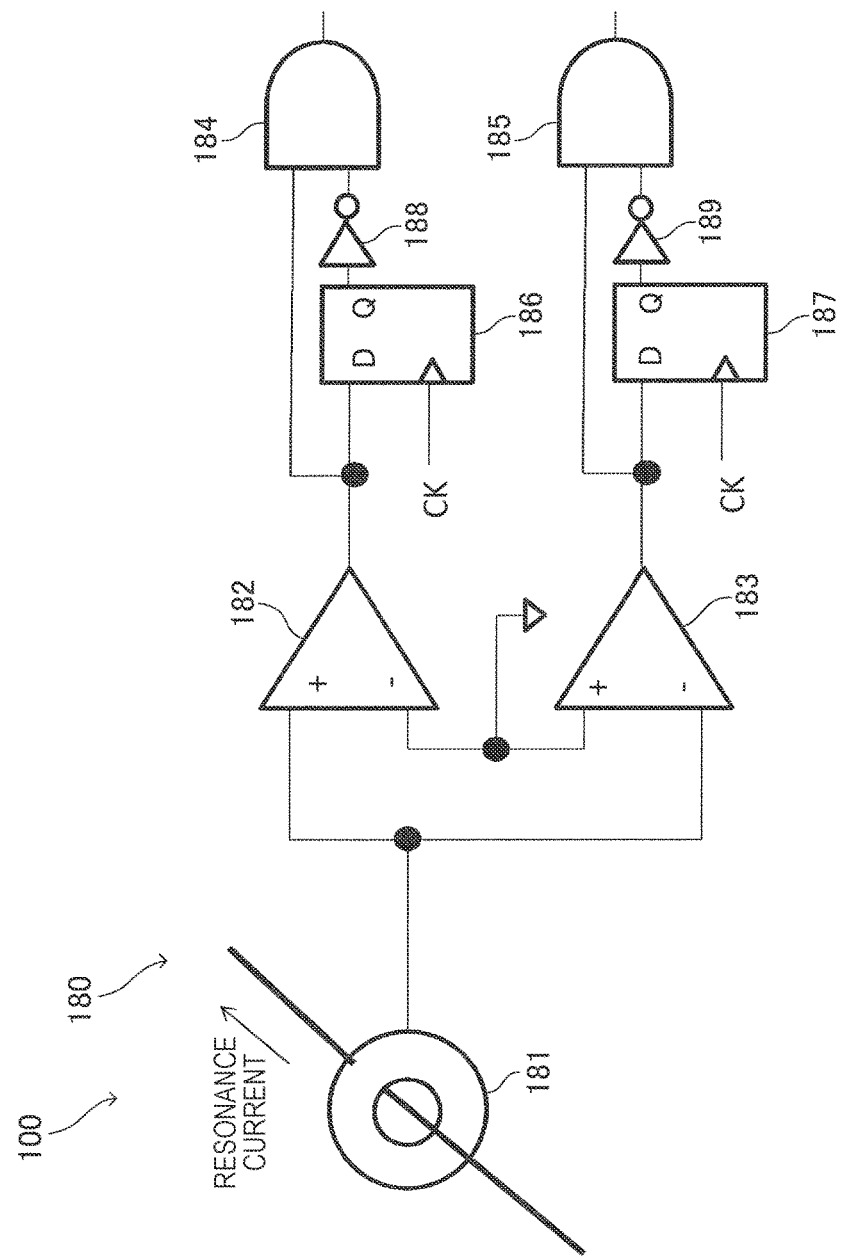
FIG. 12 is a diagram showing a configuration example of a resonance current direction detection unit of a power storage device of a first modified example of the third embodiment of the present disclosure.

FIG. 12 is a circuit diagram showing a configuration example of a resonance current direction detection unit 180 included in the power storage device 100 of the present modified example. The resonance current direction detection unit 180 is broadly constituted by a Hall element 181, first and second comparators 182 and 183, first and second AND circuits 184 and 185, first and second D-type flip-flops 186 and 187, and first and second NOT circuits 188 and 189.

The Hall element 181 is connected to the non-inverted input terminal (+) of the first comparator 182 and the inverted input terminal (−) of the second comparator 183. The inverted input terminal (−) of the first comparator 182 and the non-inverted input terminal (+) of the second comparator 183 are grounded. The output terminal of the first comparator 182 is connected to the input terminal (D) of the first D-type flip-flop 186 and the input terminal of the first AND circuit 184. The output terminal of the second comparator 183 is connected to the input terminal (D) of the second D-type flip-flop 187 and the input terminal of the second AND circuit 185. The output terminal (Q) of the first D-type flip-flop 186 is connected to the input terminal of the first NOT circuit 188. The output terminal (Q) of the second D-type flip-flop 187 is connected to the input terminal of the second NOT circuit 189. The output terminal of the first NOT circuit 188 is connected to the input terminal of the first AND circuit 184. The output terminal of the second NOT circuit 189 is connected to the input terminal of the second AND circuit 185. The first and second D-type flip-flops 186 and 187 are configured to receive an input of a clock signal CK having a sufficiently higher frequency than a resonance frequency of a resonance current.

Figure 13:
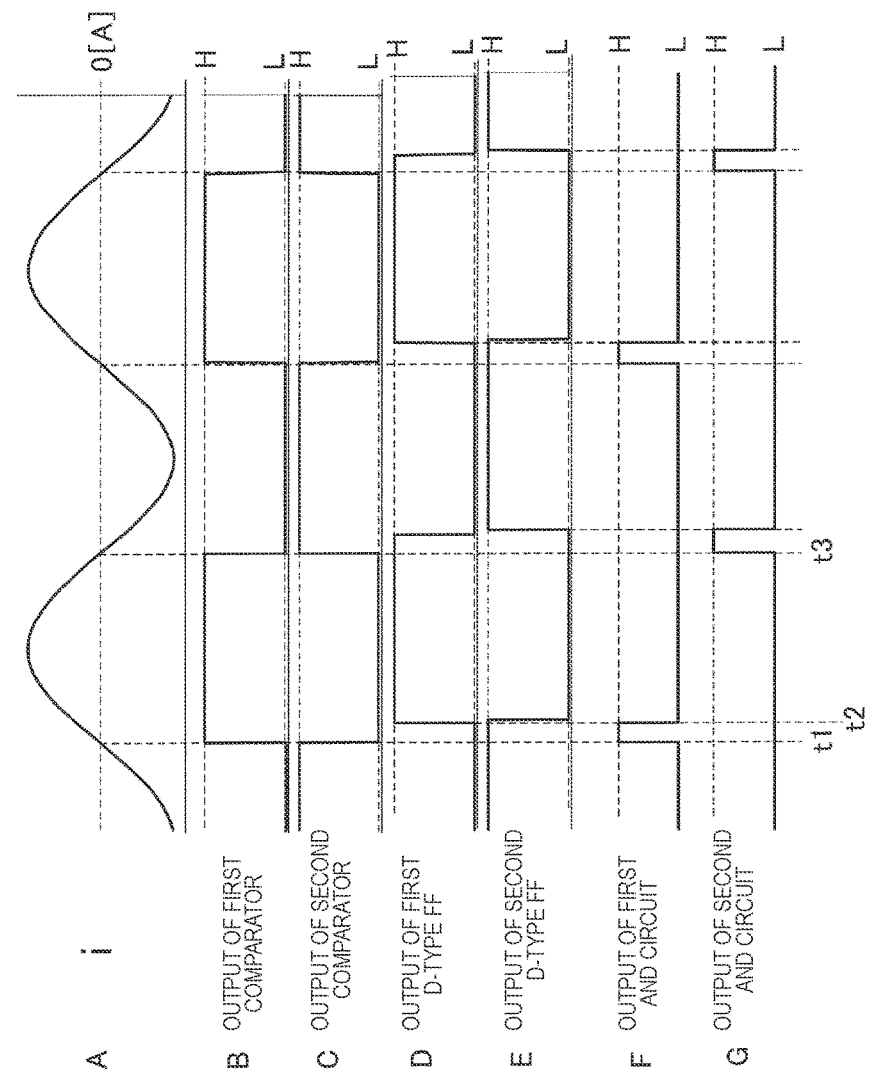
FIG. 13 includes time charts showing an operation example of the resonance current direction detection unit of the power storage device of the first modified example of the third embodiment of the present disclosure. Specifically, A thereof shows a resonance current flowing in a series resonance circuit, B shows an output of a first comparator, C shows an output of a second comparator, D shows an output of a first D-type flip-flop, E shows an output of a second D-type flip-flop, F shows an output of a first AND circuit, and G shows an output of a second AND circuit.

An operation example of the resonance current direction detection unit 180 will be described with reference to the time charts of FIG. 13.

First, the resonance current i, i.e., the direction of the resonance current, is switched from the reverse direction, i.e., the direction from the series resonance circuit 120 to a cell, to the forward direction, i.e., the direction from a cell to the series resonance circuit 120, at a time t1 as shown in FIG. 13A. In other words, the value of the resonance current i is switched from negative to positive at the time t1.

Accordingly, when the first comparator 182 receives an input of an electrical signal corresponding to the resonance current i in the forward direction from the Hall element 181, a value of the non-inverted input terminal (+) becomes higher than a value of the inverted input terminal (−). As a result, as shown in FIG. 13B, the output of the first comparator 182 becomes "High" (indicated by H in the drawing), i.e., "1," at the time t1.

On the other hand, when the second comparator 183 receives an input of an electrical signal corresponding to the resonance current i of the forward direction from the Hall element 181, a value of the non-inverted input terminal (+) becomes lower than a value of the inverted input terminal (−). Accordingly, as shown in FIG. 13C, the output of the second comparator 183 becomes "Low" (indicated by L in the drawing), i.e., "0," at the time t1.

While the output "High" of the first comparator 182 is input to the D terminal of the first D-type flip-flop 186, the input value of the clock signal is "Low" (which is not illustrated), and thus the output Q of the first D-type flip-flop 186 of the previous status is maintained. Accordingly, the output of the first D-type flip-flop 186 (the first D-type PP) becomes "Low" at the time t1 as shown in FIG. 13D.

On the other hand, while the output "Low" from the second comparator 183 is input to the D terminal of the second D-type flip-flop 187, the input value of the clock signal is "Low" (which is not illustrated), and thus the previous status of the output Q of the second D-type flip-flop 187 is maintained. Accordingly, the output of the second D-type flip-flop 187 (the second D-type FF) becomes "High" at the time t1 as shown in FIG. 13E.

The output "High" of the first comparator 182 and the output "High" of the first NOT circuit 188 which negates the output of the first D-type flip-flop 186 are input to the first AND circuit 184. Accordingly, the output of the first AND circuit 184, i.e., logical product, becomes "High" at the time t1 as shown in FIG. 13F.

On the other hand, the output "Low" of the second comparator 183 and the output "Low" of the second NOT circuit 189 which negates the output of the second D-type flip-flop 187 are input to the second AND circuit 185. Accordingly, the output of the second AND circuit 185 becomes "Low" at the time t1 as shown in FIG. 13G.

As described above, the resonance current direction detection unit 180 detects that the direction of the current at the time t1 is the forward direction based on the output "High" of the first AND circuit 184 and the output "Low" of the second AND circuit 185. Then, the resonance current direction detection unit 180 outputs the detection result to the power storage control device 130.

Next, at the time t2 at which a slight time has elapsed from the time t1, the clock signal input to the first and second D-type flip-flops 186 and 187 is switched from "Low" to "High," although it is not illustrated. Accordingly, the output of the first D-type flip-flop 186 is switched to "High" that is an input value of the D terminal as shown in FIG. 13D. In addition, the output of the second D-type flip-flop 187 is switched to "Low" that is an input value of the D terminal as shown in FIG. 13E. Accordingly, the output of the first AND circuit 184 is switched to "Low" at the time t2. On the other hand, the output of the second AND circuit 185 remains "Low."

Next, the direction of the resonance current i is switched from the forward direction to the reverse direction at a time t3. In the operation of the resonance current direction detection unit 180, "High" and "Low" are reversed from those at the time t1. In other words, it is detected that the direction of the current is the reverse direction at the time t3 based on the output "Low" of the first AND circuit 184 and the output "High" of the second AND circuit 185.

Note that a configuration of the resonance current direction detection unit 180 is not limited to that shown in FIG. 12.

Figure 14:
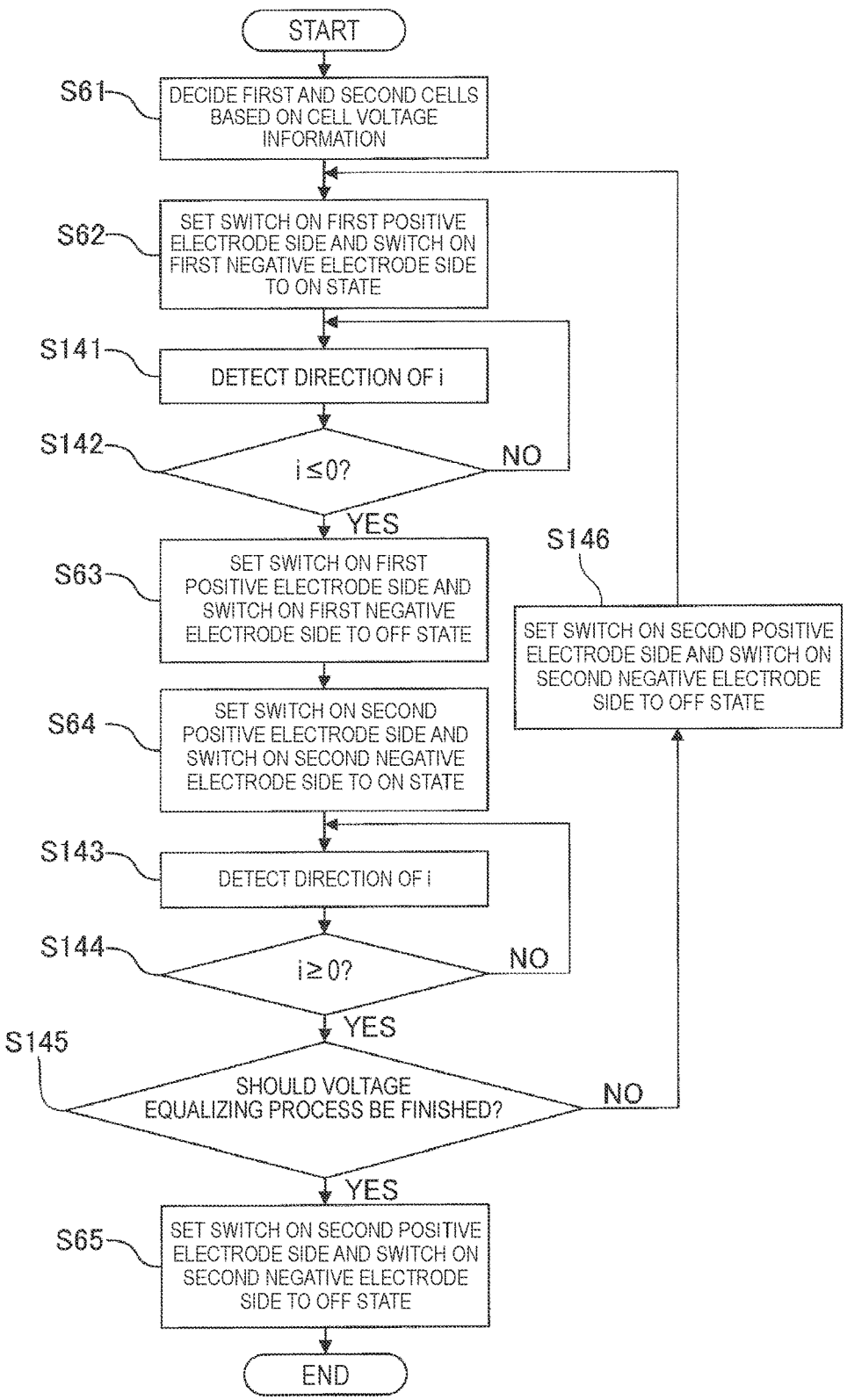
FIG. 14 is a flowchart showing an operation example of the power storage device of the first modified example of the third embodiment of the present disclosure.

[Device Operation Example] FIG. 14 is a flowchart showing an operation example of the power storage device 100 of the present embodiment. The operation example shown in FIG. 14 includes an embodiment of the power storage control method according to the present disclosure.

The operation example of FIG. 14 includes the following differences from FIG. 6. That is, in FIG. 14, Step 141 (S141) and Step 142 (S142) are executed between Step 62 (S62) and Step 63 (S63). In addition, in FIG. 14, Step 143 (S143) to Step 146 (S146) are executed after Step 64 (S64).

Specifically, in Step 141 (S141), the resonance current direction detection unit 180 detects a direction of the resonance current i.

In Step 142 (S142), the power storage control device 130 determines whether or not i≤0, i.e., the direction of the resonance current i has changed, based on the detection result of Step 141 (S141). Then, when a positive determination result is obtained in Step 142 (S142), the power storage control device proceeds to Step 63 (S63), and when a negative determination result is obtained, the power storage control device returns to Step 141 (S141).

In Step 143 (S143), the resonance current direction detection unit 180 detects a direction of the resonance current i.

In Step 144 (S144), the power storage control device 130 determines whether or not i≥0, i.e., the direction of the resonance current i has changed, based on the detection result of Step 143 (S143). Then, when a positive determination result is obtained in Step 144 (S144), the power storage control device proceeds to Step 145 (S145), and when a negative determination result is obtained, the power storage control device returns to Step 143 (S143).

In Step 145 (S145), the power storage control device 130 determines whether the voltage equalizing process should be finished. This determination can be made based on, for example, whether or not an external control signal is input to the power storage control device 130, whether a voltage difference between a first cell and a second cell is within prescribed values, or the like. Then, when a positive determination result is obtained in Step 145 (S145), the power storage control device proceeds to Step 65 (S65), and when a negative determination result is obtained, the power storage control device returns to Step 146 (S146).

In Step 146 (S146), the power storage control device 130 switches the switch on the second positive electrode side and the switch on the second negative electrode side to an off state, and proceeds to Step 62 (S62).

As long as the voltage equalizing process is repeated a plurality of times, i.e., a plurality of cycles, when necessary, and energy is transferred between cells equal in number in each cycle, transfer of energy between cells of which the numbers are different in different cycles belongs to the scope of the present disclosure.

According to the power storage device 100 of the present modified example, a timing at which movement of energy between the first cell or the second cell and the series resonance circuit 120 is deemed to have been completed can be detected using a simple method such as one with respect to a change of a direction of a current, and the cell can be disconnected from the series resonance circuit 120. Accordingly, a more rapid voltage equalizing process is possible at a low cost. In addition, the resonance current direction detection unit 180 can detect a direction of a resonance current rapidly and accurately.

8. Fourth Embodiment

Device Configuration Example

A power storage device 100 of the present embodiment has a different timing at which connection of a cell and a series resonance circuit 120 is switched from the power storage devices 100 of FIGS. 8 and 12. Details thereof will be described below.

A power storage control device 130 of the present embodiment is configured to disconnect a second cell from the series resonance circuit 120 and then to maintain a disconnection state of all cells from the series resonance circuit 120 during a set period (hereinafter referred to as a waiting period). In addition, the power storage control device 130 is configured to determine whether or not transfer of energy, i.e., a voltage equalizing process, should be finished based on a voltage of a cell during the waiting period.

A form of the waiting period is not limited, and a proper time can be set for the power storage control device 130 for measurement of a voltage of a cell and determination of appropriateness of the voltage equalizing process. The waiting time may be changeable.

[Device Operation Example]

[Time Charts]

Figure 15:
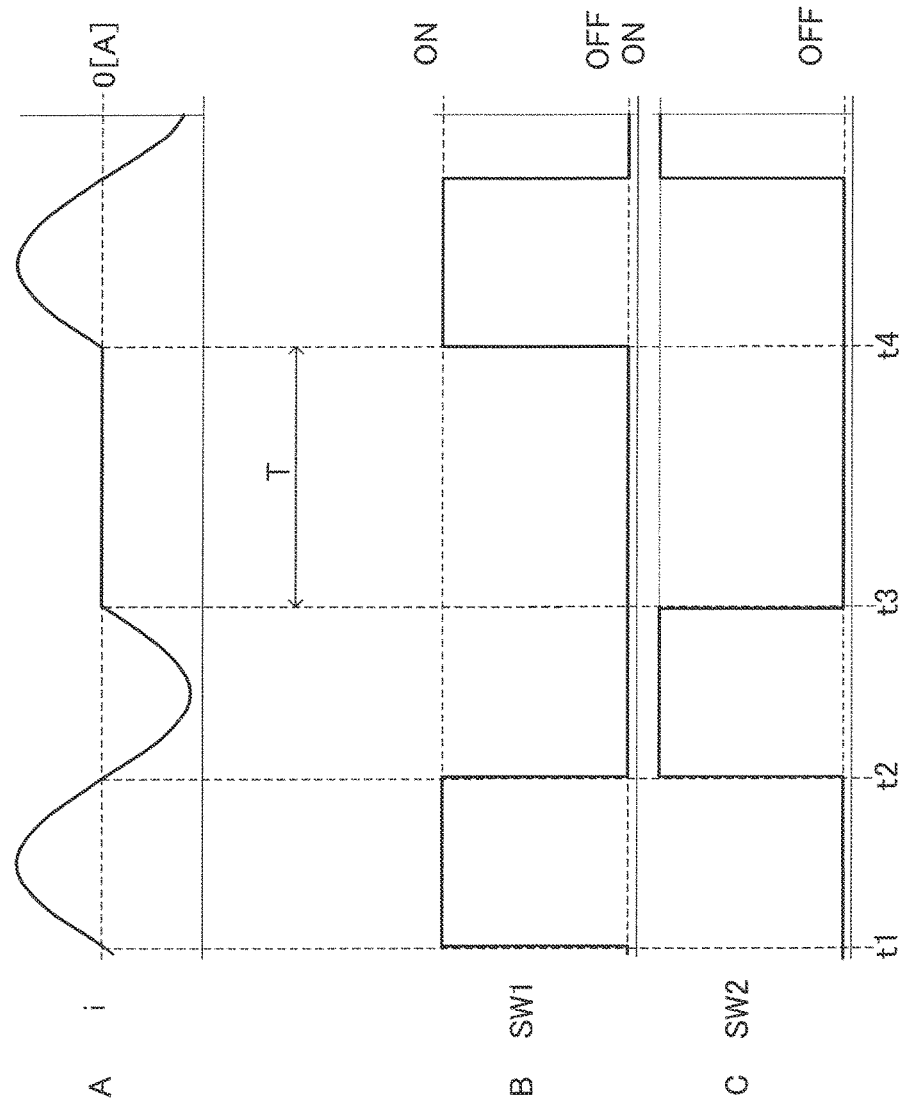
FIG. 15 includes time charts showing an operation example of a power storage device of a fourth embodiment of the present disclosure, among which A is a time chart showing a resonance current flowing in a series resonance circuit, B is a time chart showing open and closed states of a first switch, and C is a time chart showing open and closed states of a second switch.

FIG. 15 is a diagram showing an operation example of the power storage device 100 of the present embodiment using similar time charts to those of FIG. 11.

In the time charts of FIG. 15, after the switch SW2 is switched off at the time t3, the switch SW1 is switched on at a time t4 at which a waiting time T has elapsed therefrom. During the waiting time T, the power storage control device 130 determines whether the voltage equalizing process should be finished based on a detection result of a cell voltage. Since the resonance current i is 0 A during the waiting time T, the cell voltage measured during the waiting time T has an accurate value that is not affected by internal impedance of the cell. If appropriateness of finishing the voltage equalizing process is determined based on such an accurate cell voltage, a proper determination result can be obtained. Note that, when the voltage equalizing process is determined to be finished during the waiting period T, the power storage control device 130 does not switch the switch SW1 on at the time t4.

[Flowchart]

Figure 16:
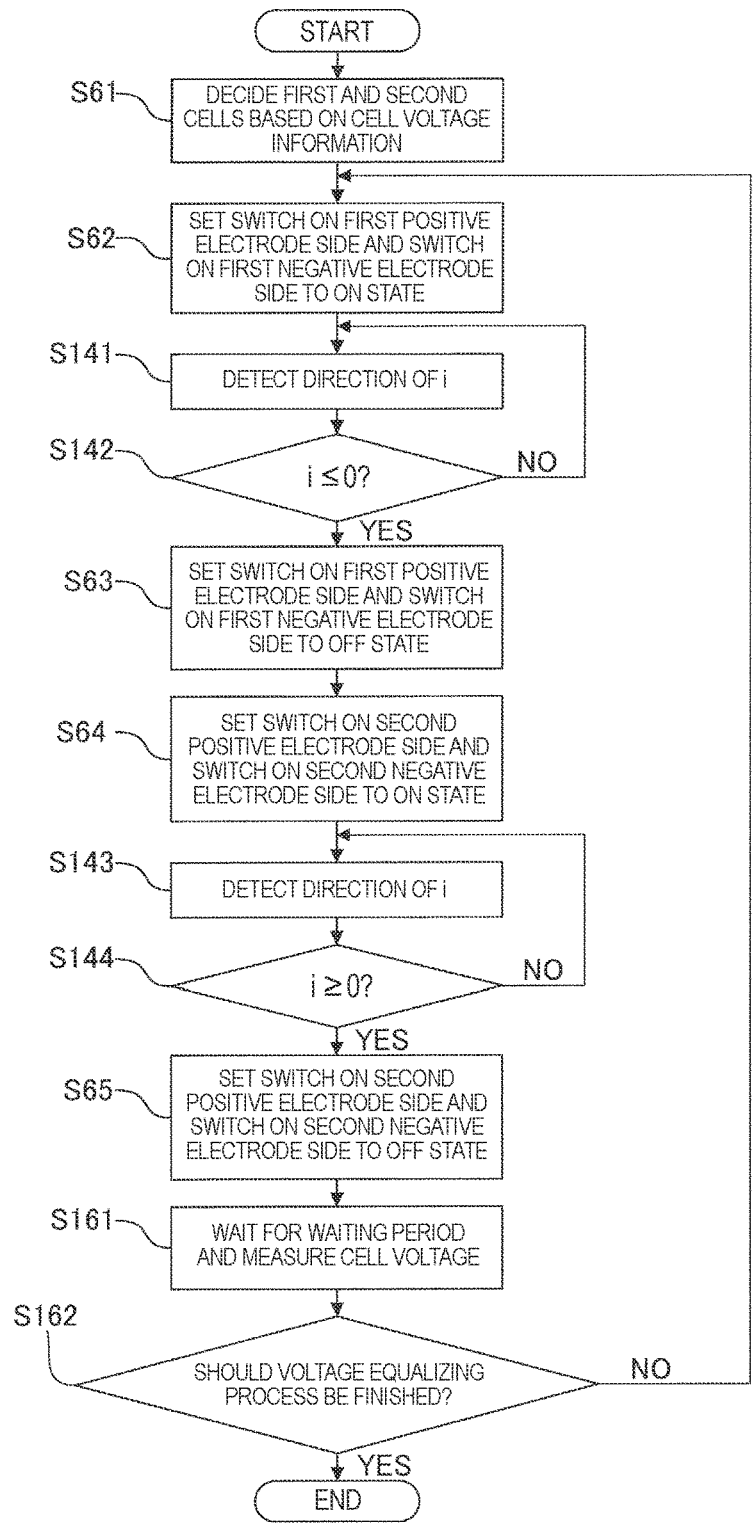
FIG. 16 is a flowchart showing the operation example of the power storage device of the fourth embodiment of the present disclosure.

FIG. 16 is a diagram showing the operation example of the power storage device 100 of the present embodiment in a flowchart. The flowchart of FIG. 16 has a different process after Step 144 (S144) from the flowchart of FIG. 14. Specifically, in FIG. 16, after a positive determination result is obtained in Step 144 (S144), Step 65 (S65), Step 161 (S161), and Step 162 (S162) are executed in order.

Specifically, in Step 161 (S161), the power storage control device 130 waits for next connection of a first cell to the series resonance circuit 120 for the waiting period and measures a cell voltage during the waiting period. The cell voltage detection units 150a and 150b shown in FIG. 4 may be caused to measure the cell voltage.

In Step 162 (S162), the power storage control device 130 determines whether or not the voltage equalizing process should be finished based on the measurement result of the cell voltage in Step 161 (S161). Then, when a positive determination result is obtained in Step 162 (S162), the power storage control device finishes the process, and when a negative determination result is obtained, the power storage control device proceeds to Step 62 (S62).

According to the present embodiment, appropriateness of finishing the voltage equalizing process can be properly determined based on an accurate cell voltage measured during a waiting period, and further, the voltage equalizing process can be performed more suitably.

9. First Modified Example of the Fourth Embodiment

Device Configuration Example

A power storage device 100 of the present embodiment has a different timing at which connection of a cell and a series resonance circuit 120 is switched from the power storage device 100 of FIGS. 15 and 16. Details thereof will be described below.

A power storage control device 130 of the present embodiment is configured to maintain a disconnection state of all cells from the series resonance circuit 120 during a waiting period even after a first cell is disconnected from the series resonance circuit 120, and to determine appropriateness of finishing a voltage equalizing process during the waiting period. This waiting period may also be set to be changeable with respect to the power storage control device 130.

[Device Operation Example]

[Time Charts]

Figure 17:
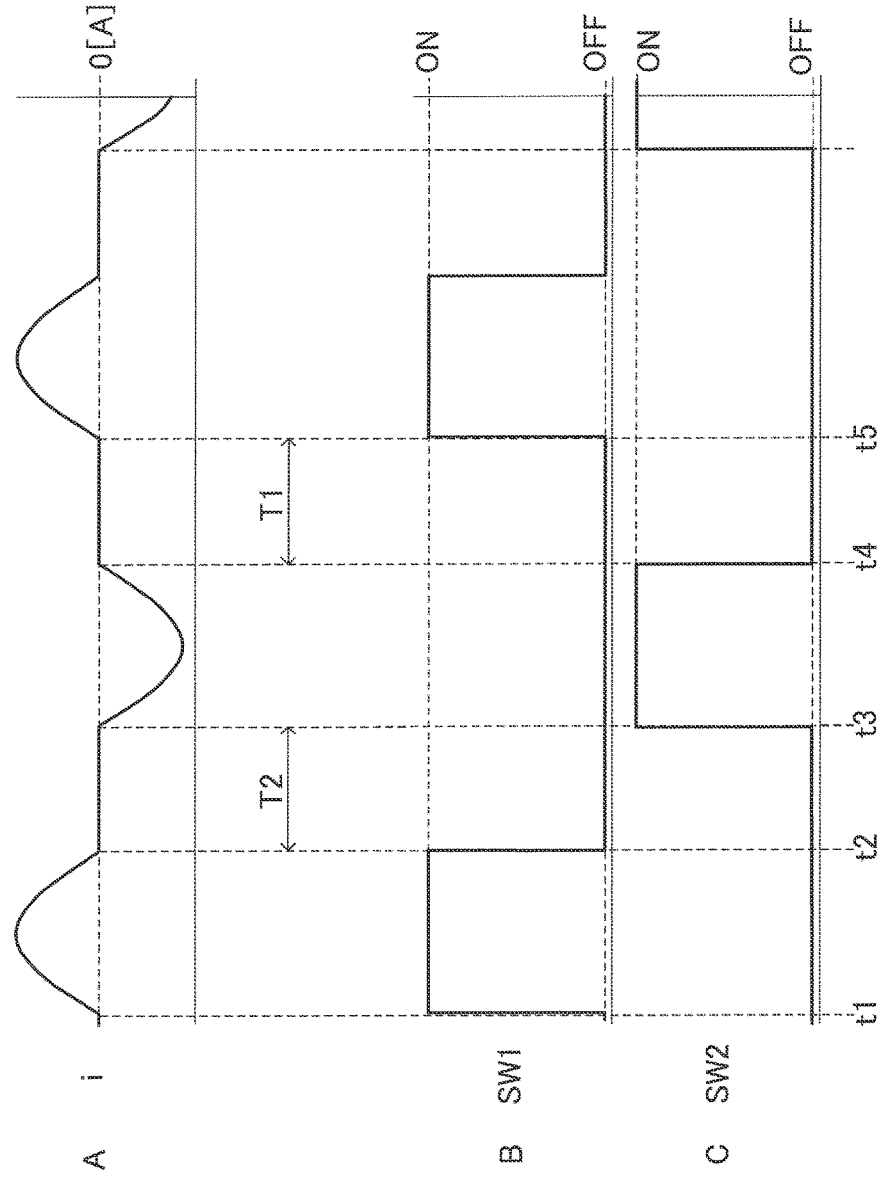
FIG. 17 includes time charts showing an operation example of a power storage device of a first modified example of the fourth embodiment of the present disclosure, in which A is a time chart showing a resonance current flowing in a series resonance circuit, B is a time chart showing open and closed states of a first switch, and C is a time chart showing open and closed states of a second switch.

FIG. 17 includes time charts showing an operation example of the power storage device 100 of the present embodiment. In the time charts of FIG. 17, after the switch SW1 is switched off at the time t2, the switch SW2 is switched on at the time t3 at which a second waiting period T2 has elapsed. In addition, in the time charts of FIG. 17, after the switch SW2 is switched off at the time t4, the switch SW1 is switched on at a time t5 at which a first waiting period T1 has elapsed. During the waiting periods T1 and T2, the power storage control device 130 determines whether or not the voltage equalizing process should be finished based on a detection result of a cell voltage. The waiting periods T1 and T2 may be the same as or different from each other.

[Flowchart]

Figure 18:
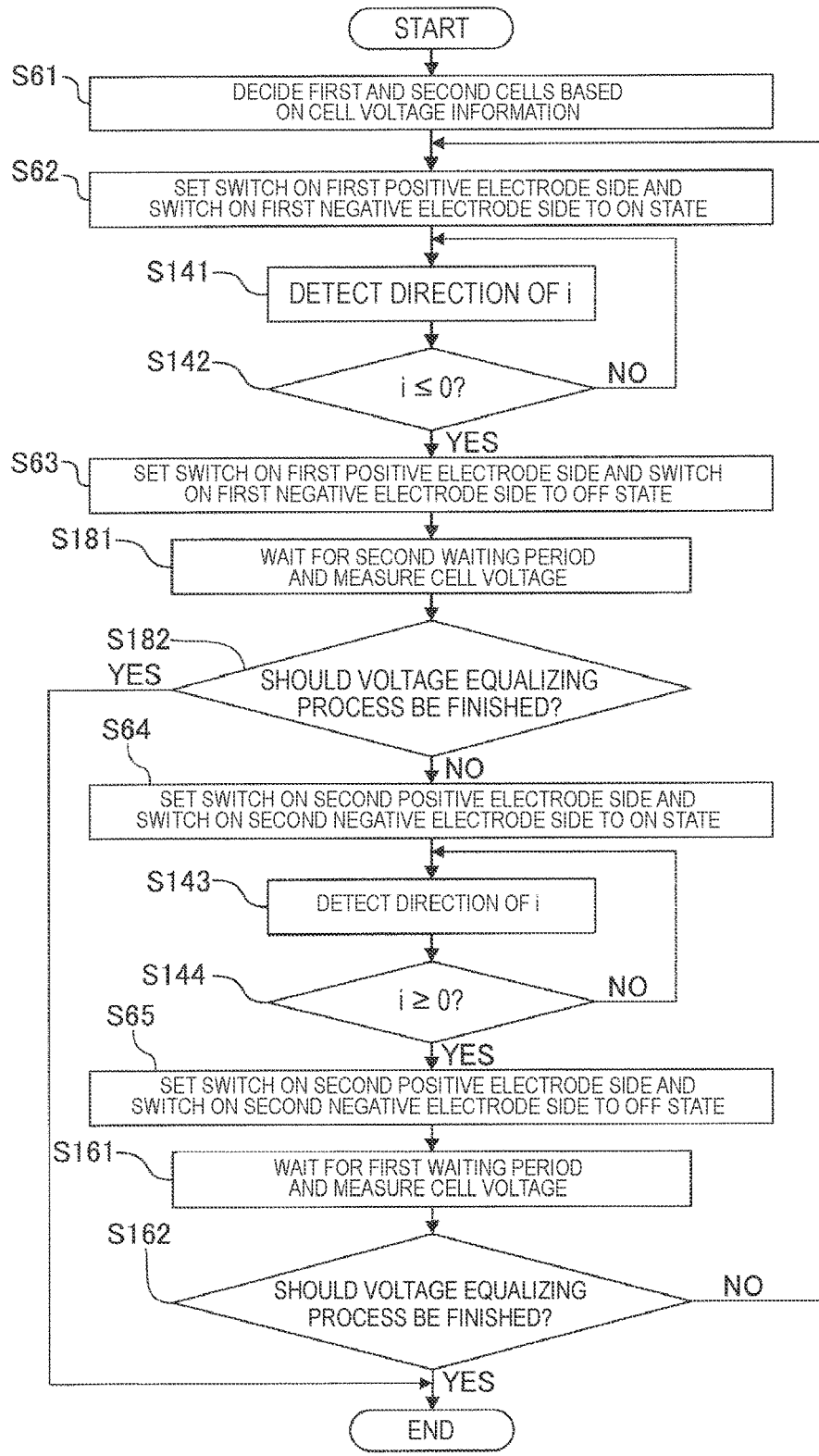
FIG. 18 is a flowchart showing the operation example of the power storage device of the first modified example of the fourth embodiment of the present disclosure.

FIG. 18 is a flowchart showing the operation example of the power storage device 100 of the present embodiment. The flowchart of FIG. 18 is different from the flowchart of FIG. 16 in that Step 181 (S181) and Step 182 (S182) are executed between Step 63 (S63) and Step 64 (S64).

Specifically, in Step 181 (S181), the power storage control device 130 waits for connection of a second cell to the series resonance circuit 120 for the second waiting period and measures a cell voltage during the second waiting period.

In Step 182 (S182), the power storage control device 130 determines whether or not the voltage equalizing process should be finished based on the measurement result of the cell voltage of Step 181 (S181). Then, when a positive determination result is obtained in Step 182 (S182), the power storage control device finishes the process, and when a negative determination result is obtained, the power storage control device proceeds to Step 64 (S64).

According to the power storage device 100 of the present modified example, it is possible to increase chances of accurately determining appropriateness of finishing the voltage equalizing process.

10. Fifth Embodiment

Device Configuration Example

Figure 19:
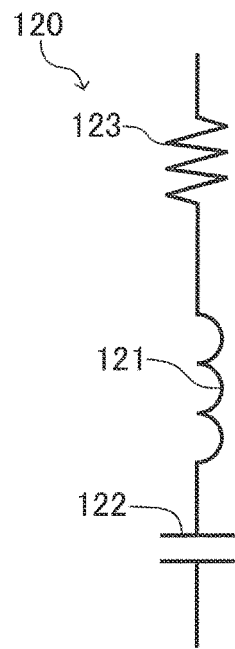
FIG. 19 is a diagram schematically showing a configuration example of a part of a power storage device of a fifth embodiment of the present disclosure.

FIG. 19 is a diagram showing a configuration example of a series resonance circuit 120 of a power storage device 100 of the present embodiment. The series resonance circuit 120 of the present embodiment is different from the series resonance circuits 120 of the first to fourth embodiments in that it has a resistance 123, in addition to a reactor 121 and a capacitor 122. In other words, the series resonance circuit 120 of the present embodiment is an RLC series resonance circuit.

[Device Operation Example]

Figure 20:
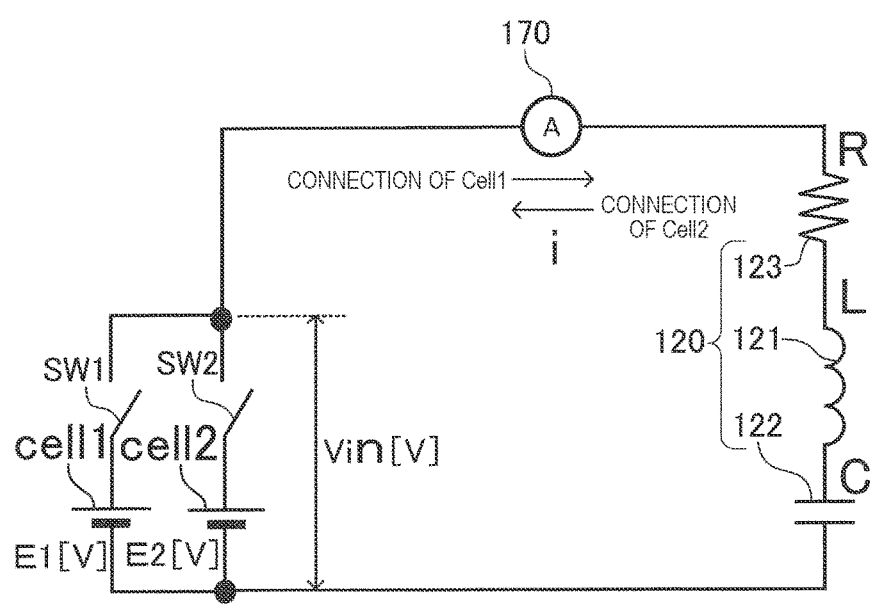
FIG. 20 is a diagram showing the power storage device of the fifth embodiment of the present disclosure as an equivalent circuit.

An operation example of the power storage device 100 of the present embodiment can be described as an operation example of an equivalent circuit of the power storage device 100 shown in FIG. 20.

With respect to the equivalent circuit of FIG. 20, the peak value Ipeak [A] of a resonance current i flowing in a first cell (Cell1) and a second cell (Cell2) is a value indicated by the following expression (1).

$$I\text{peak}=(E1-E2)/(2\times R) \quad (1)$$

In the expression (1), E1 represents a voltage [V] of the first cell. E2 represents a voltage [V] of the second cell. R represents a value [Ω] of the resistance 123.

As the expression (1) indicates, the peak value Ipeak varies according to a value of the resistance 123, and as a resistance value increases, a smaller peak value Ipeak is obtained.

The resonance current i [A] is a value indicated by the following expression (2).

$$i=\{(E1-E2)/(2\times R)\}\times\sin \omega_0 t \quad (2)$$

In the expression (2), $\omega_0$ represents a resonance angle frequency [rad/s] expressed by the following expression (3).

$$\omega_0=1/(L\times C)^{1/2} \quad (3)$$

In the expression (3), L represents a self-inductance [H] of the reactor 121, and C represents electrostatic capacitance [F] of the capacitor 122.

Note that a resonance frequency $f_0$ is $\omega_0/2\pi$ from the expression (3).

In the expression (2), in a first-half cycle, i.e., in a period in which $\omega_0 t$ is 0 to $\pi$ [rad], discharge is performed from the first cell to the series resonance circuit 120. On the other hand, in a second-half cycle, i.e., in a period in which $\omega_0 t$ is $\pi$ to $2\pi$ [rad], charge is performed from the series resonance circuit 120 to the second cell. The average discharge current Idis [A] of the first-half cycle and the average charge current Icha [A] of the second-half cycle can be obtained by integrating the expression (2) for each half cycle of a resonance frequency and averaging the results. Specifically, the average discharge current Idis and the average charge current Icha have a value expressed by the following expression (4).

$$I\text{cha}=I\text{dis}=(E1-E2)/(\pi\times R) \quad (4)$$

If connection of a cell and the series resonance circuit 120 is switched at a timing at which i is 0 A or a timing at which the direction of i changes, electric charge corresponding to the expression (4) can be supplied from the first cell to the second cell.

According to the power storage device 100 of the present embodiment, since the peak current Ipeak can be suppressed by the resistance 123, a burden imposed on a cell can be more effectively reduced.

11. First Modified Example of the Fifth Embodiment

Figure 21:
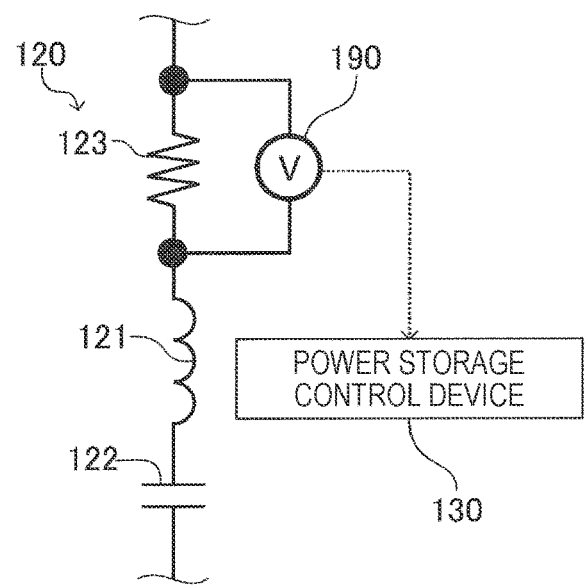
FIG. 21 is a diagram schematically showing a configuration example of a part of a power storage device of a first modified example of the fifth embodiment of the present disclosure.

FIG. 21 is a diagram showing a main part of a power storage device 100 of the present modified example. The power storage device 100 of the present modified example is configured such that a power storage control device 130 detects the direction and magnitude of a current flowing in a series resonance circuit 120 based on a potential difference of both ends of a resistance 123 of the series resonance circuit 120. The potential difference of both ends of the resistance 123 may be detected by a voltage detection unit 190.

According to the power storage device 100 of the present modified example, costs can be reduced more even when the resonance current detection unit 170 of FIG. 8 and the resonance current direction detection unit 180 of FIG. 12 are provided to detect a resonance current.

12. Second Modified Example of the Fifth Embodiment

Figure 22:
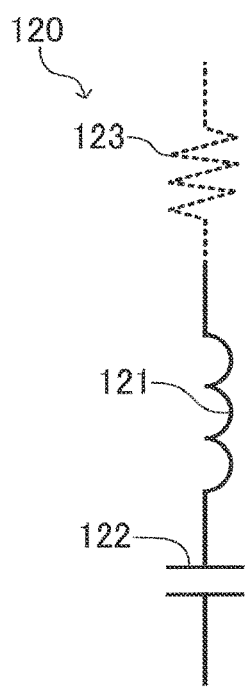
FIG. 22 is a diagram schematically showing a configuration example of a part of a power storage device of a second modified example of the fifth embodiment of the present disclosure.

FIG. 22 is a diagram showing a series resonance circuit 120 of a power storage device 100 of the present modified example. The series resonance circuit 120 of FIG. 22 is different from the series resonance circuit 120 of FIG. 19 in that a resistance 123 is a parasitic resistance. The parasitic resistance may be a parasitic resistance of at least one of a reactor 121, a circuit wire, and a switch. According to the present modified example, a peak value of a resonance current can be suppressed using a small number of parts.

13. Sixth Embodiment

Device Configuration Example

A power storage device 100 of the present embodiment has a different configuration for switching connection of a cell and a series resonance circuit 120 from the power storage devices 100 of the first to fifth embodiments. Details thereof will be described below.

A power storage control device 130 of the present modified example is configured to switch connection of the series resonance circuit 120 and a cell using a resonance frequency of the series resonance circuit 120.

Here, like the period between the time t1 and the time t2 of FIG. 11, a period from connection of one cell to the series resonance circuit 120 to connection of another cell replacing the one cell to the series resonance circuit 120 is defined as a connection switching cycle. Since the connection switching cycle is a half cycle of a resonance cycle of the series resonance circuit 120, it is indicated with $\pi(L \times C)^{1/2}$ [s]. The power storage control device 130 of the present modified example can be said to be configured to switch connection of the series resonance circuit 120 and a cell in each connection switching cycle.

The power storage control device 130 may be configured to store information such as a resonance frequency and a connection switching cycle, and to operate by computing a connection switching timing based on the stored information.

[Device Operation Example]

Figure 23:
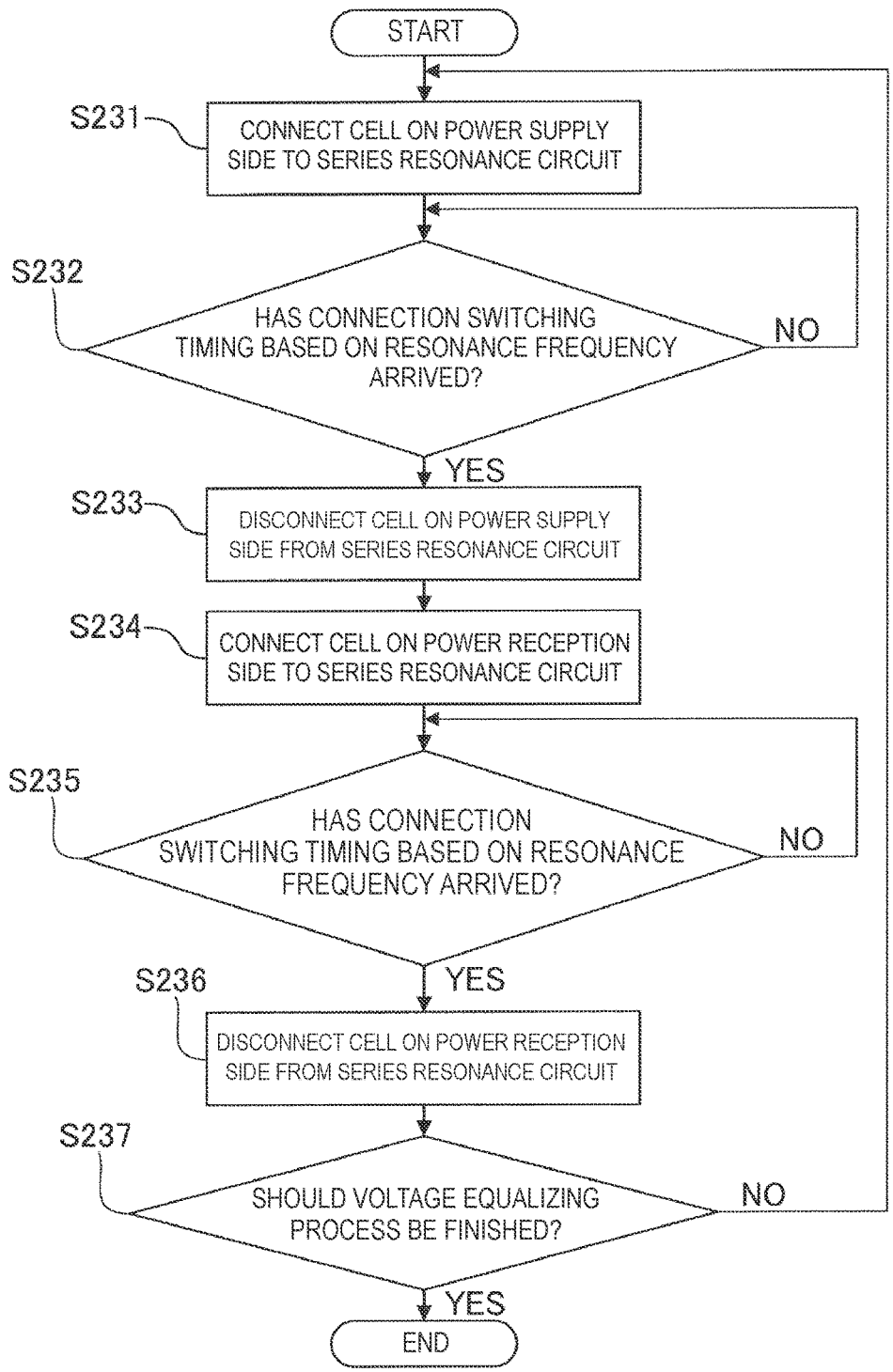
FIG. 23 is a flowchart showing an operation example of a power storage device of a sixth embodiment of the present disclosure.

FIG. 23 is a flowchart showing an operation example of the power storage device 100 of the present embodiment. In FIG. 23, first, the power storage control device 130 connects a cell on a power supply side to the series resonance circuit 120 in Step 231 (S231).

Next, in Step 232 (S232), the power storage control device 130 determines whether or not a connection switching timing based on a resonance frequency of the series resonance circuit 120 has arrived. Then, when a positive determination result is obtained in Step 232 (S232), the power storage control device proceeds to Step 233 (S233), and when a negative determination result is obtained, the power storage control device returns to Step 232 (S232).

Next, in Step 233 (S233), the power storage control device 130 disconnects the cell on the power supply side from the series resonance circuit 120.

Next, in Step 234 (S234), the power storage control device 130 connects a cell on a power reception side to the series resonance circuit 120.

Next, in Step 235 (S235), the power storage control device 130 determines whether or not a connection switching timing based on a resonance frequency of the series resonance circuit 120 has arrived. Then, when a positive determination result is obtained in Step 235 (S235), the power storage control device proceeds to Step 236 (S236), and when a negative determination result is obtained, the power storage control device repeats Step 235 (S235).

Next, in Step 236 (S236), the power storage control device 130 disconnects the cell on the power reception side from the series resonance circuit 120.

Then, in Step 237 (S237), the power storage control device 130 finishes this voltage equalizing process when the process should be finished, and returns to Step 231 (S231) when the voltage equalizing process is to be continued. The determination of whether to finish the voltage equalizing process may be performed before Step 237 (S237).

According to the power storage device 100 of the present embodiment, connection of a cell can be switched at a timing proper for transfer of energy, with no need to monitor a current flowing in the series resonance circuit 120.

14. Seventh Embodiment

The power storage device 100 of the present embodiment shows a different resonance frequency of the series resonance circuit 120 from the power storage devices 100 of the first to sixth embodiments.

Specifically, the resonance frequency of the series resonance circuit 120 according to the present embodiment is a frequency when an imaginary number component in a Cole-Cole plot of internal impedance of cells measured using an AC impedance method is 0.

Here, in the AC impedance method, the internal impedance of each frequency is measured while a frequency is changed by applying an alternate current to cells. The Cole-Cole plot is one method for illustrating a measurement result of the AC impedance method. In the Cole-Cole plot, the internal impedance of cells for each frequency obtained using the AC impedance method is plotted on a complex plane whose horizontal axis represents real number components of internal impedance and whose vertical axis represents imaginary number components of the internal impedance.

Figure 24:
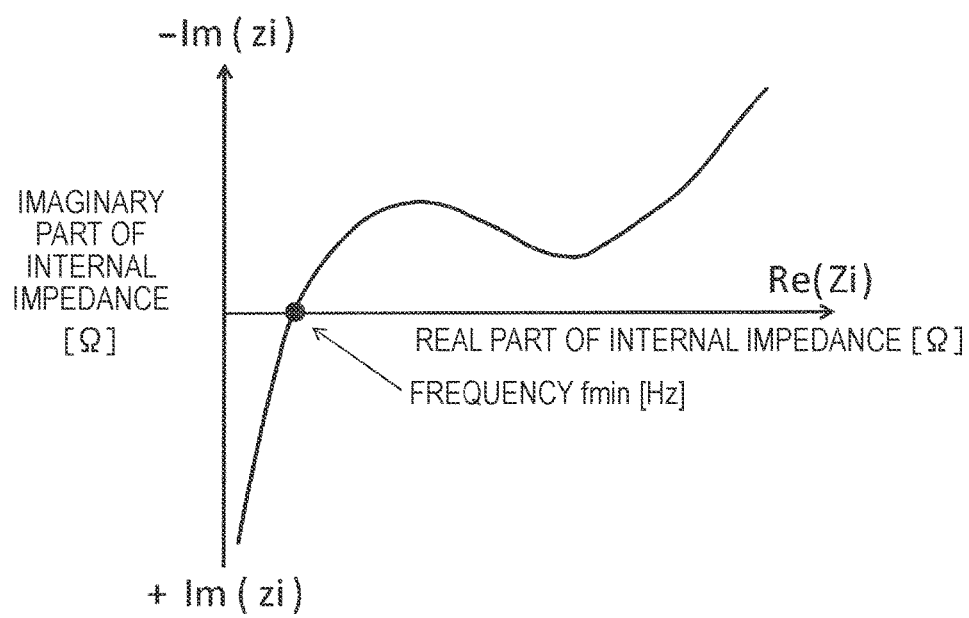
FIG. 24 is a Cole-Cole plot diagram for describing a configuration example of a power storage device of a seventh embodiment of the present disclosure.

An example of the Cole-Cole plot is shown in FIG. 24. The horizontal axis of FIG. 24 represents the real part of internal impedance of a cell, and the vertical axis of FIG. 24 represents the imaginary part of the internal impedance of the cell. In FIG. 24, the frequency when an imaginary component of the internal impedance becomes 0 is fmin [Hz]. In this case, the series resonance circuit 120 may be designed so that fmin serves as a resonance frequency. Specifically, it is preferable to select the self-inductance L of the reactor 121 and the electrostatic capacitance C of the capacitor 122 in advance to satisfy $fmin=1/\{2\pi \times (L \times C)^{1/2}\}$. Note that fmin may be a value of 1 k [Hz] to 10 k [Hz].

In the power storage device 100 of the present embodiment, internal impedance of a cell becomes the minimum with respect to a current flowing between a cell and the series resonance circuit 120. Therefore, energy can be efficiently transferred.

15. First Modified Example of the Seventh Embodiment

A power storage device 100 of the present modified example has a different setting of a resonance frequency of series resonance circuit 120 from the power storage device 100 described with reference to FIG. 24.

Figure 25:
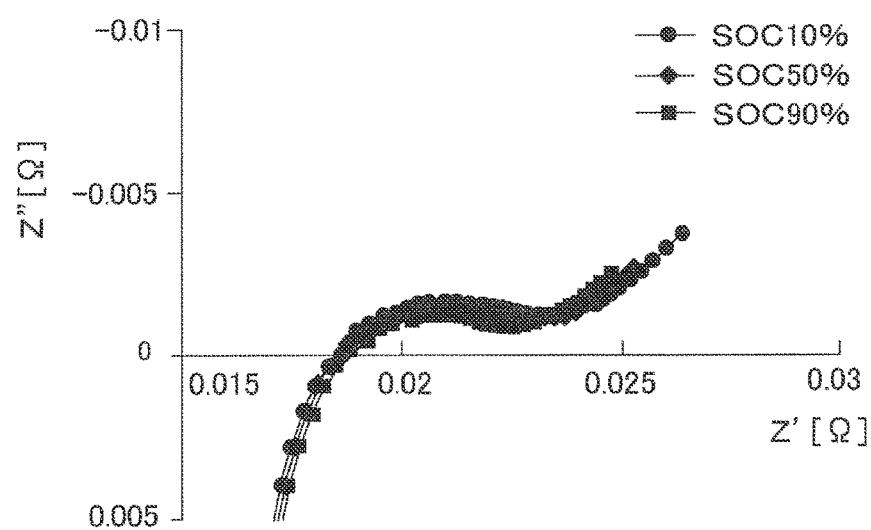
FIG. 25 is a Cole-Cole plot diagram for describing a configuration example of a power storage device of a first modified example of the seventh embodiment of the present disclosure.

Examples of Cole-Cole plots for describing the power storage device 100 of the present modified example are schematically shown in FIG. 25. The horizontal axis Z' of FIG. 25 represents the real part of internal impedance of cells and the vertical axis Z" of FIG. 25 represents the imaginary part of the internal impedance of the cells. In FIG. 25, the Cole-Cole plots of respective states of charge (SOC) [%] are shown as examples of charge ratios of cells. The Cole-Cole plots of FIG. 25 are plots based on measurement results of the internal impedance of the cells by a frequency response analyzer (FRA). Specific numerical values in FIG. 25 are merely examples, and do not limit the scope of the present disclosure.

As shown in FIG. 25, a Cole-Cole plot may be different according to SOC. When the frequency fmin when the imaginary number component in the Cole-Cole plot is 0 is different according to SOC, fmin is obtained for each SOC and a resonance frequency of the series resonance circuit 120 may be set comprehensively taking obtained fmin of each SOC into consideration. For example, the series resonance circuit 120 may be designed such that the average value of fmin of the SOC is obtained and the average value is set to the resonance frequency.

According to the present modified example, energy can be efficiently transferred in consideration of a changing SOC.

16. Eighth Embodiment

A power storage device 100 of the present embodiment has a specific cell with respect to the power storage devices 100 of the first to seventh embodiments.

Specifically, a cell of the present embodiment has a discharge characteristic in which a change of a voltage is 0.25 V or lower in a series of sections spanning 50% or more of the section of the charge ratio of 0% to 100%.

Figure 26:
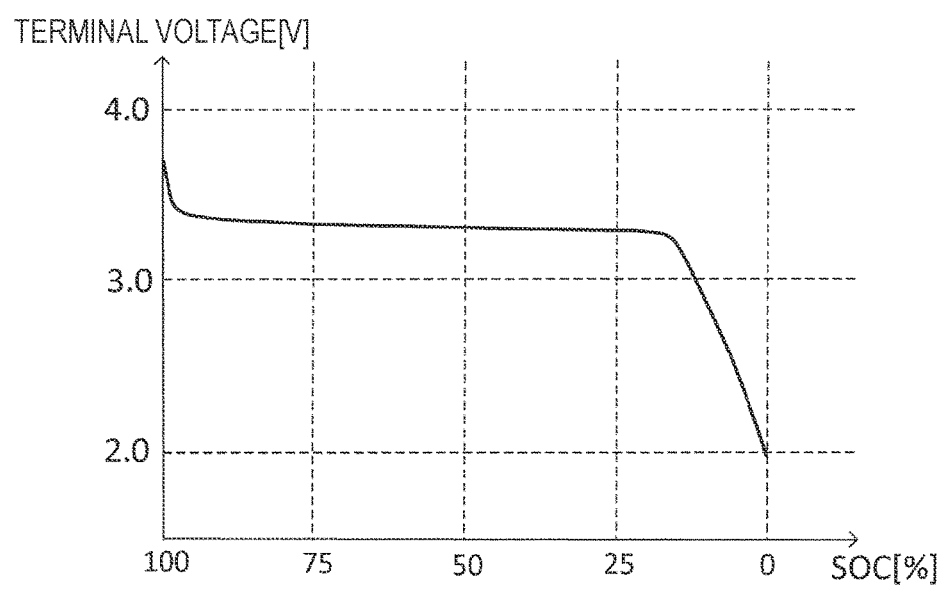
FIG. 26 is a discharge curve diagram of a cell for describing a configuration example of a power storage device of an eighth embodiment of the present disclosure.

As an example of such a discharge characteristic, a discharge curve obtained when a lithium ion secondary battery of which a material of the positive electrode is olivine-type iron phosphate is discharged at 1 C is shown in FIG. 26. With respect to the discharge curve of FIG. 26, the horizontal axis represents SOC [%] as an example of a discharge ratio, and the vertical axis represents terminal voltages [V] of cells. In the discharge curve of FIG. 26, a change of voltage is 0.25 V or lower in a series of sections spanning 50% or more of the section of the discharge ratio of 0% to 100%. More specifically, the discharge curve of FIG. 26 shows a change of voltage of about 0.1 V in the section of the discharge ratio of 20% to 90%. Although the discharge curve of FIG. 26 shows a significant voltage drop attributable to internal resistance immediately after the start of discharge, it continuously shows a flat characteristic thereafter, and thus unevenness in voltage within a battery pack configured in serial connection becomes small. The cells are not limited to lithium ion secondary batteries that use olivine-type iron phosphate.

Here, the power storage device 100 has relatively even temperature distribution therein and a load current fluctuates little in comparison to an automobile or the like, and thus unevenness of voltages between cells is small. Therefore, in the power storage device 100, it is desirable in the voltage equalizing process to secure cell balance with a low current without waste, rather than rapidly resolving unevenness of voltages between cells using a high current. In addition, if a cell having a flat discharge characteristic as in the present embodiment is applied, effectiveness of a voltage equalizing process can be secured with a low current.

The above-described embodiments and modified examples may be appropriately combined.

Effects described in the embodiments and modified examples are merely illustrative and are not limitative, and other effects may be exhibited. The present disclosure may exhibit any one of a plurality of effects described in the embodiments and modified examples.

Additionally, the present technology may also be configured as below.

(1)

A power storage device including:

a plurality of cells which are connected in series;

a series resonance circuit configured to include a reactor and a capacitor; and a power storage control device configured to control a connection state of the cells and the series resonance circuit, wherein the power storage control device causes energy to be transferred between equal numbers of cells via the series resonance circuit.

(2)

The power storage device according to (1), wherein, after the power storage control device connects first cells including at least one cell to the series resonance circuit, the power storage control device connects second cells which include cells equal in number to the first cells and have a lower total voltage than the first cells to the series resonance circuit.

(3)

The power storage device according to (2), wherein the power storage control device selects a plurality of consecutive cells as the first cells, and selects consecutive cells equal in number to the first cells as the second cells.

(4)

The power storage device according to (2) or (3), wherein, when the first cells are connected to the series resonance circuit and then the direction of a current flowing in the series resonance circuit changes, the power storage control device disconnects the first cells from the series resonance circuit.

(5)

The power storage device according to (4), wherein, when the second cells are connected to the series resonance circuit and then the direction of a current flowing in the series resonance circuit changes, the power storage control device disconnects the second cells from the series resonance circuit.

(6)

The power storage device according to (5), wherein the power storage control device maintains a state in which all the cells are disconnected from the series resonance circuit during a set period after the first and/or second cells are disconnected from the series resonance circuit, and determines whether or not transfer of energy is to be finished based on a voltage of the cells during the set period.

(7)

The power storage device according to any one of (1) and (4) to (6), wherein the series resonance circuit includes a resistance, and wherein the power storage control device detects the direction of a current flowing in the series resonance circuit based on a potential difference of both ends of the resistance.

(8)

The power storage device according to any one of (1) to (3), wherein the power storage control device switches connection of the series resonance circuit and the cells using a resonance frequency of the series resonance circuit.

(9)

The power storage device according to any one of (1) to (8), wherein a resonance frequency of the series resonance circuit is a frequency when an imaginary component in a Cole-Cole plot of internal impedances of the cells measured using an AC impedance method becomes 0.

(10)

The power storage device according to any one of (2) to (9), wherein the power storage control device causes a cell having a maximum voltage to be included in the first cells.

(11)

The power storage device according to any one of (2) to (10), wherein the power storage control device causes a cell having a minimum voltage to be included in the second cells.

(12)

The power storage device according to any one of (1) to (11), further including:

a switch configured to connect or disconnect the cells and the series resonance circuit, wherein the power storage control device controls a connection state of the cells and the series resonance circuit by controlling an operation of the switch.

(13)

The power storage device according to any one of (1) to (12), wherein the cells have a discharge characteristic that a change of a voltage is 0.25 V or lower in a series of sections spanning 50% or more of a section of a charge ratio of 0% to 100%.

(14)

A power storage program for causing a computer to functions as a means of controlling a connection state of a plurality of cells which are connected in series and a series resonance circuit which includes a reactor and a capacitor and causing energy to be transferred between equal numbers of cells via the series resonance circuit.

REFERENCE SIGNS LIST

100 power storage device
110*a*, 110*b* cell
120 series resonance circuit
121 reactor
122 capacitor
130 power storage control device

The invention claimed is:

1. A power storage device, comprising:
  a plurality of cells connected in series,
    wherein each cell of the plurality of cells is a battery cell which is chargeable and dischargeable, and
    wherein the plurality of cells comprises a first set of cells and a second set of cells;
  a series resonance circuit that includes a resistor, a reactor, and a capacitor connected in series; and
  a power storage control device configured to:
    connect the first set of cells of the plurality of cells to the series resonance circuit;
    control transfer of energy between the first set of cells and the connected series resonance circuit;
    disconnect the first set of cells from the connected series resonance circuit based on a change in a direction of a current in the series resonance circuit;
    connect the second set of cells of the plurality of cells to the series resonance circuit based on the disconnection of the first set of cells; and
    control transfer of the energy between the second set of cells and the connected series resonance circuit.

2. The power storage device according to claim 1, wherein:
  a first number of cells in the first set of cells is equal to a second number of cells in the second set of cells, and
  a total voltage of the second set of cells is lower than a total voltage of the first set of cells.

3. The power storage device according to claim 2, wherein the power storage control device is further configured to:
  select a plurality of first consecutive cells from the plurality of cells as the first set of cells; and
  select a plurality of second consecutive cells from the plurality of cells as the second set of cells,
    wherein the plurality of second consecutive cells is equal in number to the plurality of first consecutive cells.

4. The power storage device according to claim 2, wherein the power storage control device is further configured to disconnect the second set of cells from the connected series resonance circuit based on the change in the direction of the current in the series resonance circuit.

5. The power storage device according to claim 4, wherein the power storage control device is further configured to:

maintain a state in which the plurality of cells is disconnected from the series resonance circuit, wherein the state is maintained for a set period after at least one of the first set of cells or the second set of cells is disconnected from the series resonance circuit; and
determine whether to terminate the transfer of the energy based on a voltage of the plurality of cells during the set period.

6. The power storage device according to claim 1,
  wherein the power storage control device is further configured to detect the direction of the current in the series resonance circuit, and
  wherein the direction of the current is detected based on a potential difference between a first end of the resistor and a second end of the resistor.

7. The power storage device according to claim 1, wherein the power storage control device is further configured to switch connection states between the series resonance circuit and the plurality of cells based on a resonance frequency of the series resonance circuit.

8. The power storage device according to claim 1, wherein a resonance frequency of the series resonance circuit corresponds to an imaginary component in a Cole-Cole plot of internal impedances of the plurality of cells that has value of 0, wherein the value of the imaginary component is measured based on an AC impedance method.

9. The power storage device according to claim 2, wherein the power storage control device is further configured to control a second cell having a maximum voltage among the plurality of cells, such that the second cell is included in the first set of cells.

10. The power storage device according to claim 9, wherein the power storage control device is further configured to control a third cell having a minimum voltage among the plurality of cells, such that the third cell is included in the second set of cells.

11. The power storage device according to claim 1, further comprising
  a switch configured to one of connect or disconnect at least one cell of the plurality of cells to the series resonance circuit.

12. The power storage device according to claim 2,
  wherein the plurality of cells has a discharge characteristic in which a change of a voltage is less than or equal to 0.25 V in a series of sections, and
  wherein the series of sections span at least 50% of a section of a charge ratio (SOC) of 0% to 100%.

13. A power storage control device, comprising:
  circuitry configured to:
  connect a first set of cells of a plurality of cells to a series resonance circuit,
    wherein the plurality of cells is connected in series,
    wherein each cell of the plurality of cells is a battery cell which is chargeable and dischargeable, and
    wherein the series resonance circuit includes a resistor, a reactor, and a capacitor connected in series;
  control transfer of energy between the first set of cells and the connected series resonance circuit;
  disconnect the first set of cells from the connected series resonance circuit based on a change in a direction of a current in the series resonance circuit;
  connect a second set of cells of the plurality of cells to the series resonance circuit based on the disconnection of the first set of cells; and
  control transfer of the energy between the second set of cells and the connected series resonance circuit.

14. A power storage control method, comprising:
   in a control device:
   connecting a first set of cells of a plurality of cells to a series resonance circuit,
      wherein the plurality of cells is connected in series,
      wherein each cell of the plurality of cells is a battery cell which is chargeable and dischargeable, and
      wherein the series resonance circuit includes a resistor, a reactor, and a capacitor connected in series;
   controlling transfer of energy between the first set of cells and the connected series resonance circuit;
   disconnecting the first set of cells from the connected series resonance circuit based on a change in a direction of a current in the series resonance circuit;
   connecting a second set of cells of the plurality of cells to the series resonance circuit based on the disconnection of the first set of cells; and
   controlling transfer of the energy between the second set of cells and the connected series resonance circuit.

* * * * *